United States Patent
Nonaka et al.

(10) Patent No.: US 11,449,801 B2
(45) Date of Patent: Sep. 20, 2022

(54) LEARNING METHOD AND PROGRAM

(71) Applicant: KABUSHIKI KAISHA TOSHIBA, Tokyo (JP)

(72) Inventors: Ryosuke Nonaka, Yokohama Kangawa (JP); Toshimitsu Kaneko, Kawasaki Kanagawa (JP); Norihiro Nakamura, Kawasaki Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 387 days.

(21) Appl. No.: 16/812,497

(22) Filed: Mar. 9, 2020

(65) Prior Publication Data
US 2020/0394562 A1 Dec. 17, 2020

(30) Foreign Application Priority Data
Jun. 14, 2019 (JP) .............................. JP2019-110838

(51) Int. Cl.
*G06N 20/00* (2019.01)
*B60W 30/18* (2012.01)
*B60W 30/188* (2012.01)
*G05D 1/02* (2020.01)
*B60W 50/00* (2006.01)

(52) U.S. Cl.
CPC ........... *G06N 20/00* (2019.01); *B60W 30/188* (2013.01); *B60W 30/18163* (2013.01); *B60W 50/00* (2013.01); *G05D 1/0221* (2013.01); *B60W 2050/0075* (2013.01); *G05D 2201/0213* (2013.01)

(58) Field of Classification Search
CPC ............ G06N 20/00; B60W 30/18163; B60W 30/188; B60W 50/00; G05D 1/0221
USPC .......................................................... 706/12
See application file for complete search history.

(56) References Cited

U.S. PATENT DOCUMENTS

2017/0140270 A1 5/2017 Mnih et al.
2018/0043531 A1* 2/2018 Matsumoto ............ B25J 9/1679
(Continued)

FOREIGN PATENT DOCUMENTS

JP 2018-537767 A 12/2018

OTHER PUBLICATIONS

Lakshminarayanan et al., "Dynamic Action Repetition for Deep Reinforcement Learning," Proceedings of the Thirty-First AAAI Conference on Artificial Intelligence, pp. 2133-2139 (2017).

(Continued)

*Primary Examiner* — Isaac G Smith
(74) *Attorney, Agent, or Firm* — Finnegan, Henderson, Farabow, Garrett & Dunner L.L.P.

(57) ABSTRACT

According to one embodiment, a learning method, comprises receiving a first signal including a previous auxiliary variable value, previous action information regarding a previous action, or a set of previous scores, receiving current sensor data, selecting a current action of the control target based on the first signal, the current sensor data, and a parameter for obtaining a score from sensor data, causing the control target to execute the current action, receiving next sensor data and a reward, and updating the parameter based on the current sensor data, current action information regarding the current action, the next sensor data, and the reward. A degree of selecting a previous action as the current action is increased.

16 Claims, 15 Drawing Sheets

(56) References Cited

U.S. PATENT DOCUMENTS

2019/0357520 A1* 11/2019 Redden ................ G05B 13/027
2020/0174471 A1*  6/2020 Du .......................... H04W 4/38

OTHER PUBLICATIONS

Mnih et al., "Playing Atari with Deep Reinforcement Learning," arXiv:1312.5602v1, pp. 1-9 (Dec. 19, 2013).
Sharma et al., "Learning to Repeat: Fine Grained Action Repetition for Deep Reinforcement Learing," $5^{th}$ International Conference on Learning Representations, pp. 1-24 (2017).
Wawrzyński, "Control Policy with Autocorrelated Noise in Reinforcement Learning for Robotics," International Journal of Machine Learning and Computing, vol. 5, No. 2, pp. 91-95 (Apr. 2015).

* cited by examiner

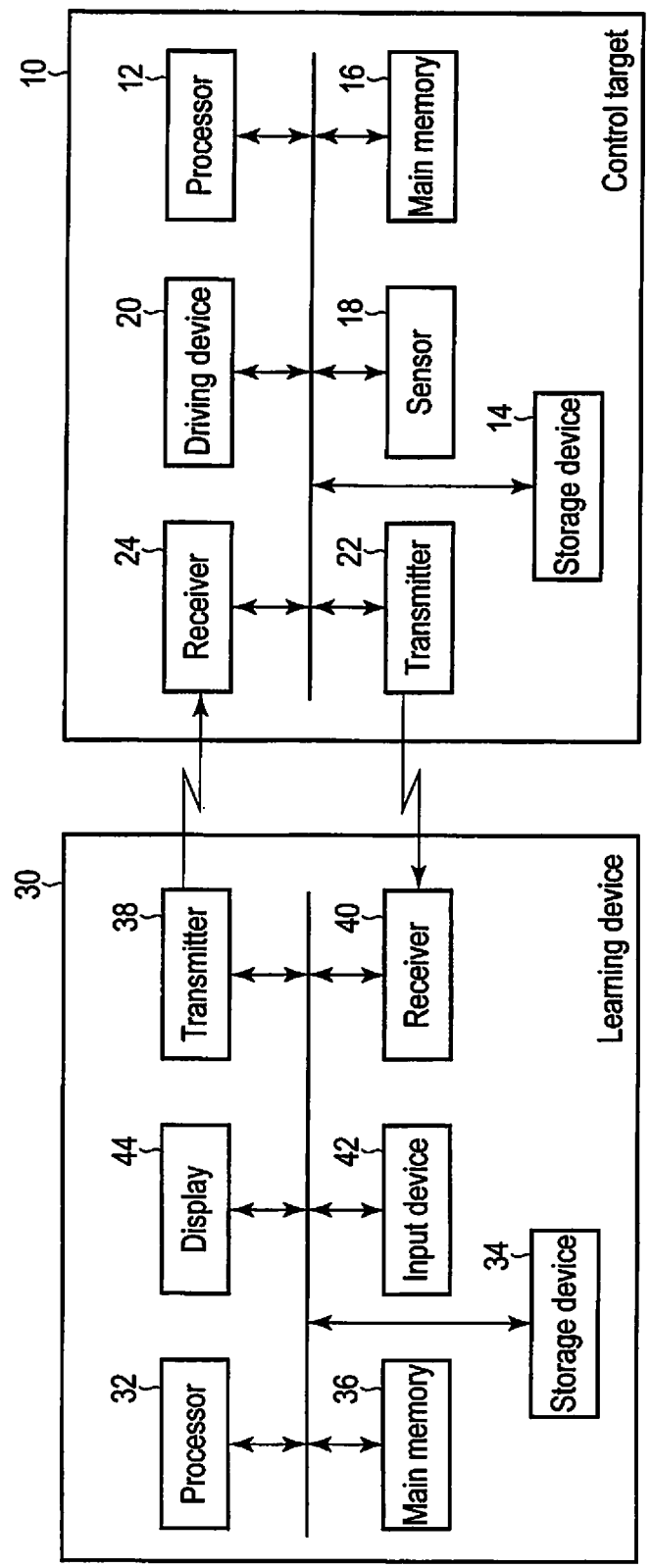
F I G. 1

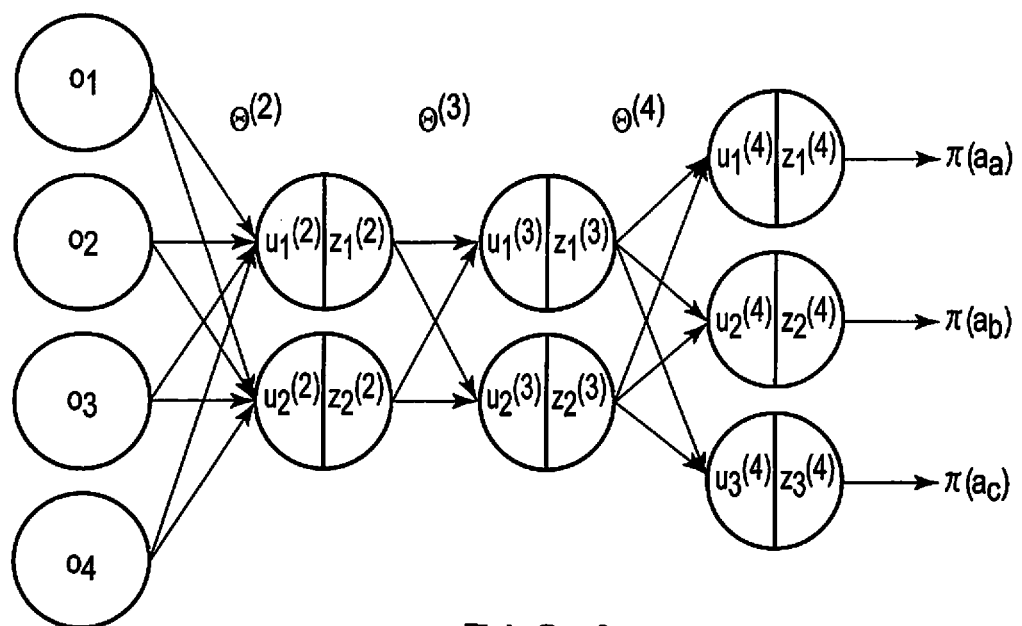
F I G. 3
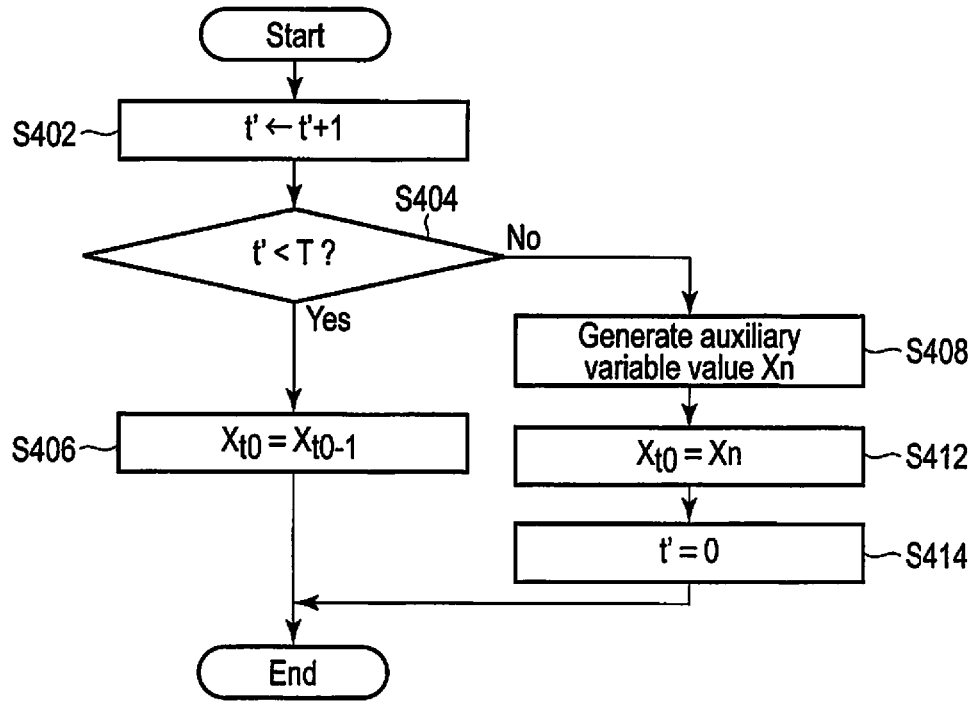
F I G. 4

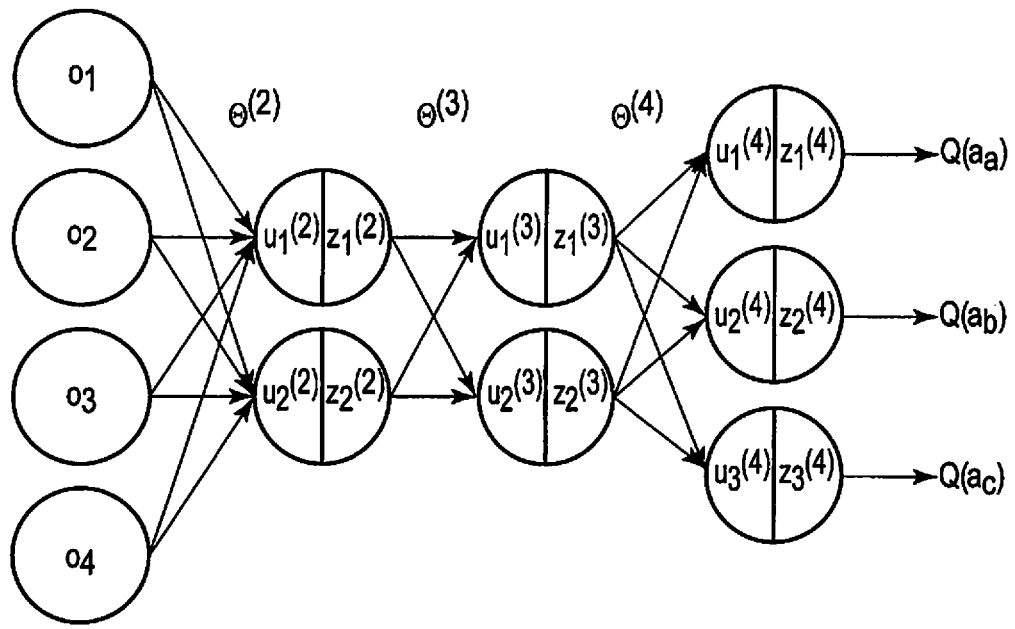
F I G. 15
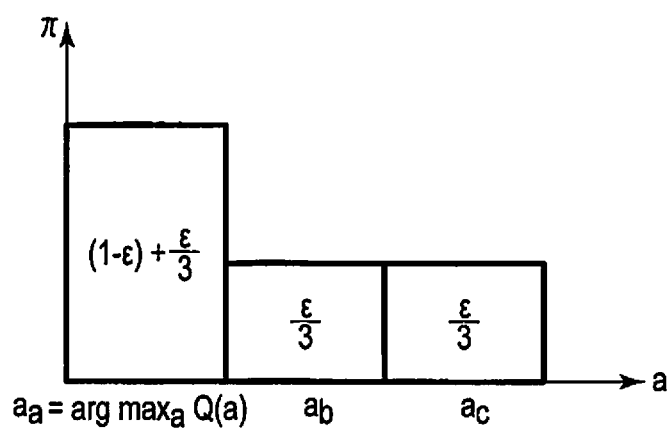
F I G. 16

LEARNING METHOD AND PROGRAM

CROSS-REFERENCE TO RELATED APPLICATIONS

This application is based upon and claims the benefit of priority from Japanese Patent Application No. 2019-110838, filed Jun. 14, 2019, the entire contents of which are incorporated herein by reference.

FIELD

Embodiments described herein relate generally to a learning method and a program.

BACKGROUND

A machine learning method (also referred to as a reinforcement learning method) is known. The method repeats selecting an action of a control target, causes the control target to execute the selected action, and evaluates an operation of the control target corresponding to the executed action. For example, the reinforcement learning method is applied to action control of a moving object such as an automobile, a robot, and a drone, or a movable object such as a robot arm.

The environment surrounding the control target in action control can change from moment to moment. Therefore, to respond quickly to the change in the environment, it is more preferable that a cycle for selecting the action and executing the selected action be short. On the other hand, if a moving object or a movable object does not execute a certain action for a certain period, an operation corresponding to the action may not be realized. In this case, if the cycle of selecting the action and executing the selected action is short with respect to a response time, it is difficult to realize the operation corresponding to the selected action, and learning cannot be performed. The response time is a period from starting the execution of the selected action to completing an operation of the control target corresponding to the action.

BRIEF DESCRIPTION OF THE DRAWINGS

FIG. 1 is a block diagram illustrating an example of a learning device for performing a machine learning method according to a first embodiment.

FIG. 3 is a diagram illustrating an example of a policy function used in a score calculation step in the flowchart illustrated in FIG. 2.

FIG. 4 is a flowchart illustrating an example of an auxiliary variable determining step in the flowchart illustrated in FIG. 2.

FIG. 15 is a diagram illustrating an example of an action value function used for action selection in a fourth embodiment.

FIG. 16 is a diagram illustrating an example of a score calculation method used for action selection in a fifth embodiment.

DETAILED DESCRIPTION

Figure 2:
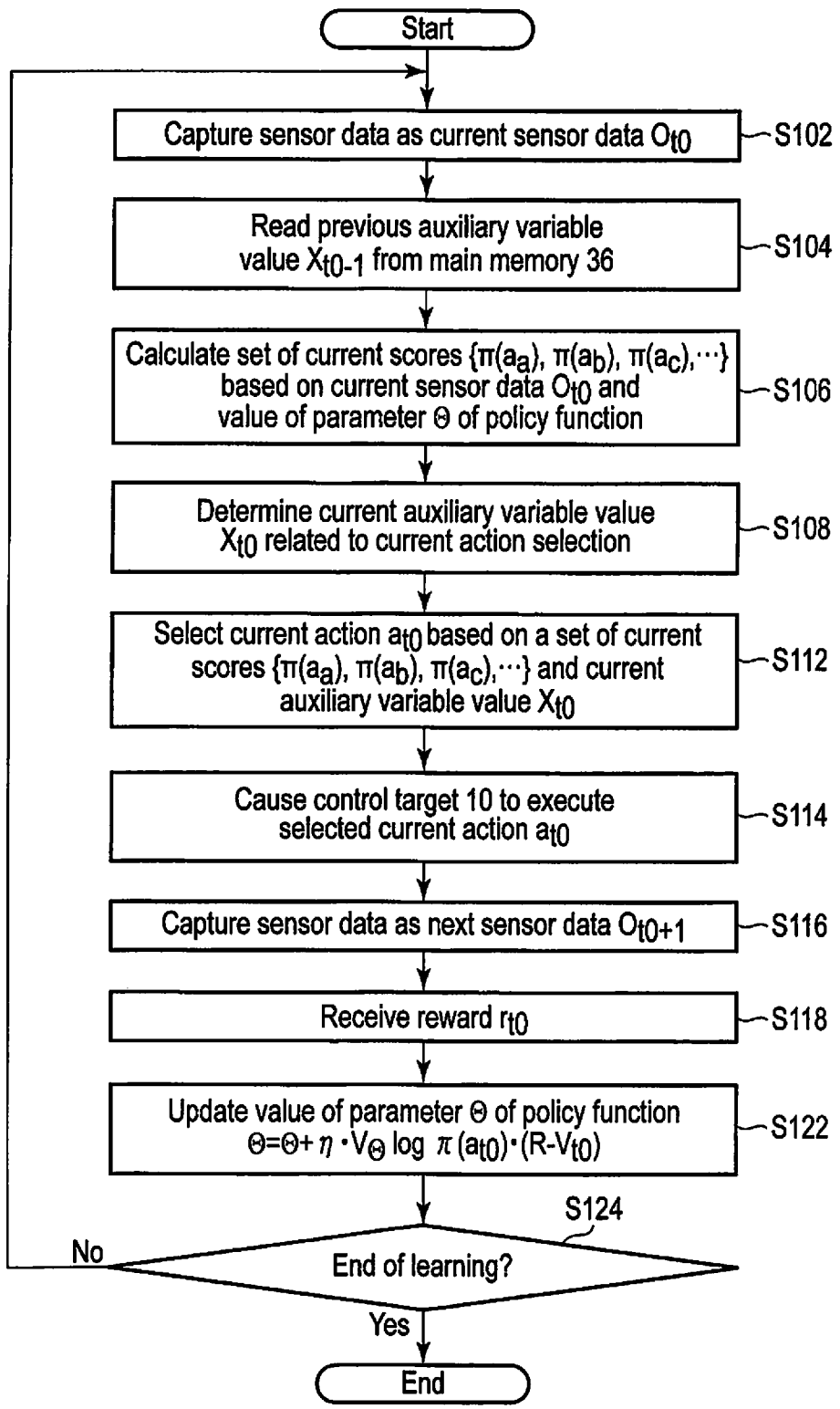
FIG. 2 is a flowchart illustrating an example of the machine learning method according to the first embodiment.

Hereinafter, embodiments of the present invention will be described with reference to the drawings. The following description exemplifies an apparatus and method for embodying the technical idea of the embodiment, but the technical idea of the embodiment is not limited to a structure, shape, arrangement, material, and the like of constituent elements described below. Variations readily conceivable by those skilled in the art are obviously included in the scope of the disclosure. For clarification of the description, in the drawings, the size, thickness, planar dimension, shape, or the like of each element may be schematically expressed by changing it from an actual embodiment. In a plurality of drawings, elements having different dimensional relationships and ratios may be included. In the drawings, corresponding elements may be denoted by the same reference numerals, and redundant description may be omitted. Although some elements may be given a plurality of names, examples of these names are merely examples, and it is not denied that other names are given to these elements. Further, it is not denied that an element to which a plurality of names is not given is also given another name. Note that, in the following description, "connection" means not only direct connection but also connection through other elements.

In general, according to one embodiment, a learning method includes receiving a first signal including a previous auxiliary variable value, previous action information regarding a previous action of a control target, or a set of previous scores; receiving current sensor data; selecting a current action of the control target based on the first signal, the current sensor data, and a value of a parameter for obtaining a score from sensor data; causing the control target to execute the current action; receiving next sensor data and a reward; and updating a value of the parameter based on the current sensor data, current action information regarding the current action, the next sensor data, and the reward. The selecting includes increasing a degree of selecting a previous action as the current action.

First Embodiment

A machine learning method according to a first embodiment includes a receiving process of receiving a previous auxiliary variable value and current sensor data, an action selection process of selecting a current action based on the value of the previous auxiliary variable value, current sensor data, and a value of the parameter, a process of executing the current action, a process of receiving next sensor data and reward, and a process of updating the value of the parameter based on the current sensor data, the current action, the next sensor data, and the reward.

[Device Configuration]

FIG. 1 is a block diagram illustrating a configuration example of a learning device 30 for executing the learning method according to the first embodiment.

The learning device 30 is electrically connected to a control target 10. The electrical connection between the learning device 30 and the control target 10 may be a wired connection or a wireless connection. When the control target 10 is a moving object such as an automobile, a robot, and a drone, the learning device 30 and the control target 10 may be connected wirelessly.

The learning device 30 receives various information on the state of the control target 10 and the state of the surrounding environment of the control target 10 from the control target 10. The learning device 30 selects the action to be taken by the control target 10 using these pieces of information. The learning device 30 causes the control target 10 to execute the selected action. The learning device 30 performs learning such that the control target 10 can select an appropriate action according to the state of the control target 10 and the state of the surrounding environment of the control target 10. In order to evaluate whether an appropriate action has been selected, the learning device 30 receives a reward for executing the action. The reward indicates whether the action has been appropriate. The learning device 30 learns the action selection of the control target 10 as follows. If the reward to be obtained in the future by executing the action is high, the learning device 30 selects more of the action in the situation. If the reward to be obtained in the future by executing the action is low, the action is selected less in the situation. For example, if the control target 10 is an automobile, examples of action options include "straight ahead", "change to right lane", "change to left lane", and the like. If there is an obstacle in front of the automobile, the action "change to right/left lane" is selected, and when the control target 10 executes that action, an operation that the automobile is "in right/left lane" is realized.

The learning device 30 includes a processor 32 such as CPU, a nonvolatile storage device 34 for storing a program and various data executed by the processor 32, a volatile main memory 36 for storing a program and data read from the storage device 34 or various data generated during learning, a transmitter 38 that transmits a drive signal and a control signal to the control target 10, a receiver 40 that receives sensor data from the control target 10, an input device 42 such as a keyboard, and a display 44 such as an LCD. The learning device 30 is also referred to as a computer. The program stored in the storage device 34 includes a program for reinforcement learning. This program is read from the storage device 34 and developed in the main memory 36.

The learning device 30 may be directly connected to the control target 10, and may be realized as a single device that performs learning related to one control target 10. Alternatively, the learning device 30 may be placed on a network and configured to learn about a plurality of control targets 10 via the network.

The control target 10 includes a processor 12, such as CPU, a nonvolatile storage device 14 for storing a program to be executed by the processor 12 and various data, a volatile main memory 16 for storing a program and data read from the storage device 14 or various data generated during learning, a sensor 18 for detecting a state of the control target 10 and a state of an environment around the control target 10, a driving device 20 that drives a moving/movable part of the control target 10, a transmitter 22 that transmits sensor data to the learning device 30, and a receiver 24 that receives the drive signal and the control signal from the learning device 30. The sensor 18 is attached to the moving/movable part. The sensor 18 may include a rotation sensor, an acceleration sensor, a gyro sensor, and an infrared sensor that detect a state of the moving/movable part, and a sensor that detects a surrounding situation such as a camera. The sensor data indicates the state of the control target 10 and the state of the environment around the control target 10.

The learning device 30 and the control target 10 may be configured to operate in synchronization. The action selection cycle of machine learning is predetermined, and the control target 10 may transmit the sensor data to the learning device 30 for each action selection cycle. Alternately, the control target 10 may transmit the sensor data to the learning device 30 in a period after an action is executed and before a next action is executed. Furthermore, the transmitter 22 may transmit the sensor data to the learning device 30 at all times or at a very short cycle (a cycle shorter than the action selection cycle).

The control target 10 is not limited to an automobile, and any object may be used. The first embodiment can be applied to any control target 10 that realizes an operation when an action is executed. Further, the control target 10 may be configured by an actual machine, or may be configured by a simulator that performs the same operation as an actual machine instead of the actual machine.

[Reinforcement Learning]

FIG. 2 is a flowchart illustrating an example of the learning method according to the first embodiment. When the learning device 30 is turned on, a program for reinforcement learning is read from the storage device 34 and developed in the main memory 36. When the program for reinforcement learning on the main memory 36 is executed, the process shown in FIG. 2 is executed. Examples of a reinforcement learning method include various methods such as an actor critic method, a SARSA method, and a Q learning method. Although the embodiment can be applied to any reinforcement learning method, a learning method in the actor critic method will be described as an example.

[Preprocessing]

The processing from steps S102 to S124 in the flowchart of FIG. 2 is periodically executed at each action selection timing. The sensor data transmitted by the control target 10 is received by the receiver 40. When the action selection timing comes, the processor 32 captures the received sensor data as current sensor data $O_{t0}$ in step S102, and writes the current sensor data $O_{t0}$ to the main memory 36. A timing t0 indicates the selection timing of the current action. The sensor data may include values detected by the sensor 18 such as values indicative of a position and a posture of the control target 10 and values indicative of a position and a size of an object existing around the control target 10. Further, the sensor data may include values that are not directly detected by the sensor 18, for example, values calculated by the processor 12, such as the presence or absence, existence probability or the like of objects positioned at various positions around the control target 10. The sensor data may include a history of actions executed by the control target 10 in the past.

Although it has been described that an actual device may be used as the control target 10, or a simulator may be used, the surrounding environment is not limited to the actual environment but may be an environment on a simulator.

In step S104, the processor 32 reads a previous auxiliary variable value $X_{t0-1}$ from the main memory 36. A timing t0-1 indicates a selection timing of a previous action and is immediately before the selection timing t0 of a current action. The auxiliary variable is a variable used in the action selection process. The previous auxiliary variable value is the auxiliary variable value used in the action selection immediately before the selection timing t0 of the current action.

[Action Selection Process]

Next, an action selection process is executed.

The action selection process according to the first embodiment includes:

(i) a process of calculating a set of current scores related to selection of a current action from current sensor data and a value of a parameter;

(ii) a process of calculating a current auxiliary variable value related to the selection of the current action; and (iii) a process of selecting the current action based on a set of current scores and the current auxiliary variable value.

In the process (ii) for calculating the current auxiliary variable value related to the selection of the current action, the previous auxiliary variable value related to the selection of the previous action is set as the auxiliary variable value related to the selection of the current action. This increases a degree in which the previous action is selected as the current action.

Specifically, in step S106, based on current sensor data $O_{t0}$ and a value of parameter Θ of the policy function, the processor 32 calculates a set of current scores $\{\pi(a_a), \pi(a_b), \pi(a_c), \ldots\}$ respectively for actions $a_a, a_b, a_c, \ldots$ that can be executed by the control target 10. The scores $\pi(a_a), \pi(a_b), \pi(a_c), \ldots$ indicate the degree in which the actions $a_a, a_b, a_c, \ldots$ are selected.

The policy function is a function that inputs sensor data and outputs scores. An example of the policy function is the neural network shown in FIG. 3. For convenience of explanation, FIG. 3 shows the scores $\pi(a_a), \pi(a_b)$, and $\pi(a_c)$ for the values o1, o2, o3, and o4 included in the current sensor data and the three types of actions $a_a, a_b$, and $a_c$. However, the number of values included in the sensor data and the number of action types are not limited to these numbers. The parameter Θ is a set of variables that change the input/output characteristics of the policy function. The parameter Θ includes variables Θ(2), Θ(3), and Θ(4) that change the input/output characteristics of the policy function and variables (not illustrated) that change the input/output characteristics of the policy function. When a neural network is used as a method for realizing the policy function, the parameter Θ includes weights (Θ(2), Θ(3), and Θ(4)) and the like of the neural network. As a method for realizing the policy function, a convolutional neural network, a recurrent neural network, a softmax function, or the like may be used in combination. Further, the policy function combined with input/output normalization and adding randomness to the input/output characteristics may be used. The value of parameter Θ of the policy function is stored in the main memory 36.

In step S108, the processor 32 determines the current auxiliary variable value $X_{t0}$ related to the current action selection and writes the determined current auxiliary variable value $X_{t0}$ to the main memory 36.

Details of step S108 are explained with reference to a flowchart shown in FIG. 4. In step S402, the processor 32 increases a value t' of a time variable by 1. In step S404, the processor 32 determines whether the value t' of the time variable is shorter than a predetermined period T. The degree in which the previous action is selected as the current action is increased in the period T. Here, the value of the period T is normalized by the action selection cycle. If the value t' of the time variable is shorter than the period T, in step S406, the processor 32 sets the previous auxiliary variable value $X_{t0-1}$ related to the previous action selection as the current auxiliary variable value $X_{t0}$ related to the current action selection.

If the value t' of the time variable is not shorter than the period T, in step S408, the processor 32 randomly generates a new auxiliary variable value Xn, for example, from the uniform distribution of the intervals (0, 1). In step S412, the processor 32 sets the value Xn as the current auxiliary variable value $X_{t0}$ related to the current action selection. In step S414, the processor 32 resets the value t' of the time variable (t'=0).

By performing the processing illustrated in FIG. 4, the auxiliary variable value $X_{t0}$ is maintained at the previous auxiliary variable value $X_{t0-1}$ related to the previous action selection for the period T.

Returning to the description of FIG. 2, in step S112, based on the set of scores $\{\pi(a_a), \pi(a_b), \pi(a_c), \ldots\}$ for the current action and the current auxiliary variable value $X_{t0}$, the processor 32 selects the current action $a_{t0}$ from the actions $a_a, a_b, a_c, \ldots$ by the inverse function method, and writes action information $A_{t0}$ indicative of the selected action $a_{t0}$ to the main memory 36. Specifically, in step S112, the processor 32 selects an action $a_j$ in which an action index j satisfies Equation 1 as the current action $a_{t0}$. In Equation 1, the action index order is a, b, . . . , the magnitude relationship is a<b< . . . , and the total number of actions is denoted by K.

$$j = \min\left\{j' \in \{a, b, \ldots, K\} : \left(\sum_{i=a}^{j'} \Pi(a_i)\right) - x_{t0} \geq 0\right\}$$ Equation 1

That is, in step S112, the processor 32 selects, as the current action $a_{t0}$, the action $a_j$ of the index j which is the smallest index of the index j' in which the sum of the action score from the index a to the action score from the index j' in order is $X_{t0}$ or more. Although the score for each action is normalized such that the sum of the scores for each action is 1, normalization is not essential.

Figure 5:
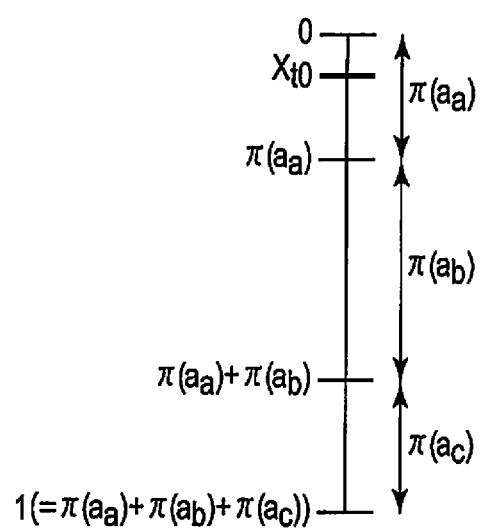
FIG. 5 is a diagram for explaining a principle of a current action selection step in the flowchart illustrated in FIG. 2.

FIG. 5 illustrates an example of the current action selection process in step S112 if the total number K of actions is 3. FIG. 5 shows an example in the case of $X_{t0} \pi(a_a)$. In this case, the action $a_a$ is selected as the current action $a_{t0}$. Similarly, if $\pi(a_a) < X_{t0} \pi(a_a) + \pi(a_b)$, the action $a_b$ is selected as the current action $a_{t0}$, and in the case of $\pi(a_a) + \pi(a_b) < X_{t0}$ $\pi(a_a) + \pi(a_b) + \pi(a_c)$ (=1), the action $a_c$ is selected as the current action $a_{t0}$.

According to such an action selection method, if there is no bias in the generation probability of the auxiliary variable value $X_{t0}$ (such as when the generation probability of $X_{t0}$ follows a uniform distribution in the interval (0,1)), an action with a larger score is more likely to be selected as the current action $a_{t0}$.

In the machine learning method according to the first embodiment, the current action $a_{t0}$ is selected directly according to the set $\{\pi(a_a), \pi(a_b), \pi(a_c), \ldots\}$ of scores for the current action calculated based on the current sensor data $O_{r0}$ and the value of parameter Θ of the policy function. In the second and third embodiments described below, the current action $a_{r0}$ is selected directly according to the set of mixed scores for the current action calculated from the set of scores for the current action, that is indirectly according to the set of scores {π($a_a$), π($a_b$), π($a_c$), . . . } for the current action.

Figure 6:
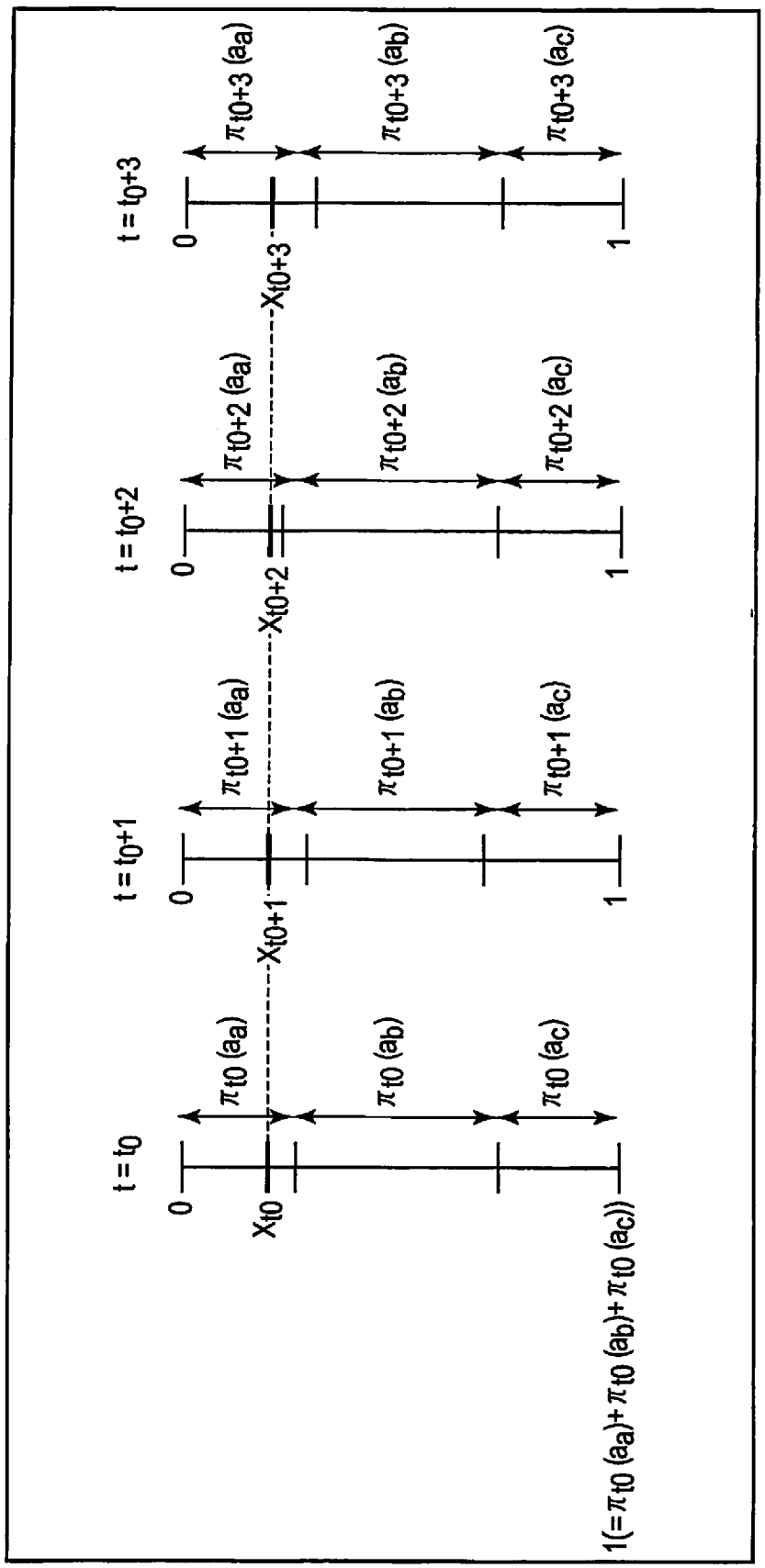
FIG. 6 is a diagram for explaining the principle of action selection when the current action selection step in the flowchart illustrated in FIG. 2 is executed a plurality of times.

An example when the current action selection process in step S112 is executed several times will be described with reference to FIG. 6. In the action selection process at a time t=t0, since $X_t \leq \pi_t(a_a)$, an action $a_a$ is selected. In the action selection process at the time t=$t_0$+1, it is assumed that a value $X_{t-1}$ of the previous auxiliary variable value related to the previous action selection process is the value $X_t$ of the auxiliary variable value related to the current action selection. Since $X_t \pi_t(a_a)$, the same action $a_a$ as the action selected at the time t=$t_0$ is also selected at the time t=$t_0$+1. That is, the action $a_a$ selected at t=$t_0$ is also selected as the action at t=$t_0$+1. Similarly, by setting the value $X_{t-1}$ of the previous auxiliary variable value related to the previous action selection process as the value $X_t$ of the auxiliary variable value related to the current action selection, the degree in which an action $a_{t-1}$ selected at the time of the previous action selection is selected as the current action $a_t$ increases.

Thus, in the action selection process of the first embodiment, by setting the value $X_{t-1}$ of the previous auxiliary variable value related to the selection of the previous action as the value $X_t$ of the current auxiliary variable value, the degree in which the action $a_{t-1}$ selected at the time of the previous action selection is selected as the current action $a_t$ increases.

Further, in the action selection process of the first embodiment, the value $X_t$ of the auxiliary variable value is maintained constant for the period T. Therefore, during this period T, the degree in which the previous action $a_{t-1}$ is selected as the current action $a_t$ increases. As illustrated in FIG. 4, the period for increasing the degree in which the previous action $a_{t-1}$ is selected as the current action $a_t$ may be constant (period T) during the learning period. However, it may further possible to randomly change or gradually shorten the period for increasing the degree during the learning period. Further, the period T may be substantially equal to the response time that is a period from starting the execution of the selected action by the control target 10 to completing an operation of the control target 10 corresponding to the action.

[Action Execution Process]

Returning to the description of FIG. 2, the processor 32 causes the control target 10 to execute the selected current action $a_{r0}$ in step S114. For example, the processor 32 transmits a drive signal and/or a control signal for executing an action corresponding to the selected action $a_{r0}$ from the transmitter 38 to the receiver 24 of the control target 10. The driving device 20 of the control target 10 drives and/or controls each movable/moving part of the control target 10 according to the drive signal and/or the control signal. As a result, the action of the control target 10 is controlled by the driving device 20. The control target 10 executes the selected action $a_{r0}$. Since step S114 is executed at each action selection timing, the processes from step S102 to step S124 are executed for each control cycle of the control target. An action of the control target 10 is not necessarily performed by the driving device 20, the user of the learning device 30 may operate the movable/moving part of the control target 10 to cause the control target 10 to perform an action. In this case, the user may operate the control target 10 in accordance with instruction information indicative of the content of the drive signal and/or the control signal from the learning device 30.

[Learning Process]

In step S116, the processor 32 captures the sensor data as next sensor data $O_{r0+1}$, and writes the next sensor data $O_{r0+1}$ into the main memory 36. The next sensor data $O_{r0+1}$ represents the state of the control target 10 and the state of the surrounding environment after the control target 10 executes the action corresponding to the action $a_{r0}$ selected in step 112. The state of the control target 10 corresponding to the next sensor data $O_{r0+1}$, and the state of the surrounding environment may be a state of the control target 10 corresponding to the current sensor data at the selection timing $t_0$+1 of a next action, and a state of the surrounding environment.

That is, assuming that the current sensor data $O_{r0}$ is a set of values representing the state of the control target 10 at the time t and the state of the surrounding environment, the next sensor data $O_{r0+1}$ may be a set of values representing the state of the control target at time t=$t_0$+1 and the state of the surrounding environment. Further, in this case, step S102 at the selection timing t0+1 of the next action can be replaced with step S116 at the current action selection timing.

In step S118, the processor 32 receives a reward $r_{r0}$ obtained when the control target 10 executes an action corresponding to the action selected in step S112. The value of the reward $r_{r0}$ may be a value given from the state of the control target 10 or the state of the surrounding environment, or may be a value obtained by inputting by the user of the learning device 30 in accordance with satisfaction or unsatisfaction of an action or an operation realized by the action. The reward may be a reward obtained during a period between a timing corresponding to the current sensor data and a timing corresponding to the next sensor data.

In step S122, the processor 32 updates the value of parameter Θ of the policy function and writes the updated value of parameter Θ into the main memory 36. The processor 32 updates the value of parameter Θ as follows. The processor 32 calculates "estimated value $V_{r0+1}$ of reward to be obtained from the present (at the time corresponding to the next sensor data) to the future regardless of a specific action" at the time corresponding to the next sensor data, from the next sensor data $O_{r0+1}$ and a value of parameter $Θ_V$ of a state value function. The processor 32 calculates an "estimated value R of reward to be obtained from the present to the future due to the execution of the selected current action $a_{r0}$", from the estimated value $V_{r0+1}$ of reward and the reward $r_{r0}$. The processor 32 calculates "the estimated value $V_{r0}$ of reward to be obtained from the present to the future regardless of a specific action", from the current sensor data $O_{r0}$ and the value of parameter $Θ_V$ of the state value function. The processor 32 updates the value of parameter Θ of the policy function based on the reward R, the estimated value $V_{r0}$ of the reward, and the action $a_{r0}$ as indicated by Equation 2. The updated value of parameter Θ may be overwritten on the value of parameter Θ in the main memory 36 before the update, or may be stored in the main memory 36 as an update history separately from the value of parameter Θ before the update.

$$Θ = Θ + η \cdot \nabla_Θ \log π(a_{r0}) \cdot (R - V_{r0}) \quad \text{Equation 2}$$

Here, $\nabla_Θ \log π(a_{r0})$ is a gradient of the logarithmic value of the score for the action $a_{r0}$ at time $t_{r0}$ by parameter Θ, and η is a learning rate. The estimated value R is an estimated value of the reward to be obtained from the present to the future by a specific action, for example, "change to left lane". The estimated value $V_{r0}$ means an average value of rewards to be obtained from the present to the future irrespective of a specific action.

The gradient $\nabla_\Theta \log \pi(a_{r0})$ corresponds to the update direction of parameter $\Theta$ such that the score for the action $a_{r0}$ increases. Therefore, by updating the value of parameter $\Theta$ of the policy function as indicated by Equation 2, if the estimated value R of reward to be obtained from the present to the future due to the execution of the action $a_{r0}$ is larger than the estimated value $V_{r0}$ of reward, the value of parameter $\Theta$ is updated such that the score for the action $a_{r0}$ is increased. Conversely, if the estimated value R of the reward to be obtained from the present to the future due to the execution of the action $a_{r0}$ is smaller than the estimated value $V_{r0}$ of the reward to be obtained from the present to the future, the value of parameter $\Theta$ is updated such that the score for the action $a_{r0}$ is decreased.

When the value of parameter $\Theta$ is updated and, for example, if the reward due to the action "change to left lane" becomes higher than the average reward, the score for the action "change to left lane" increases. Actions with high scores are easy to be selected.

As described, the processor 32 calculates the score for the action from the current sensor data $O_{r0}$ and the value of parameter $\Theta$ of the policy function. In the same manner, the processor 32 can calculate the estimated value $V_{r0}$ of the reward to be obtained from the present to the future from the current sensor data $O_{r0}$ and the value of parameter $\Theta_V$ of the state value function. As the state value function, for example, a neural network can be used in the same manner as the policy function.

From the reward $r_{r0}$ and the estimated value $V_{r0+1}$ of reward to be obtained from the next state to the future, the processor 32 can calculate the estimated value R of reward to be obtained from the present to the future due to the execution of the selected action as indicated in Equation 3. The coefficient $\gamma$ in Equation 3 is also referred to as a discount rate.

$$R = r_{r0} + \gamma \cdot V_{r0+1} \quad \text{Equation 3}$$

Similarly to the estimated value $V_{r0}$ of the reward to be obtained from the present to the future, the processor 32 can calculate the estimated value $V_{r0+1}$ of the reward to be obtained from the next state to the future from the next sensor data $O_{r0+1}$ and the value of parameter $\Theta_V$ of the state value function.

Note that the processor 32 also updates the value of parameter $\Theta_V$ of the state value function as indicated in Equation 4. The coefficient $\eta_V$ is also referred to as a learning rate.

$$\Theta_V = \Theta_V - \eta_V \nabla_{\Theta_V}(R - V_{r0})^2 \quad \text{Equation 4}$$

In step S124, the processor 32 determines whether to end the learning. This determination may be made based on the number of learning times or the learning time, or based on a learning end instruction or a learning continuation instruction input by the user depending on whether a desired operation is realized by the action. When it is determined that the learning is not ended, the processor 32 executes the process of step S102 again. When it is determined that the learning is to be ended, the flowchart is ended.

[Application of Learning Result]

The learning result is stored in the main memory 36 as the value of parameter $\Theta$ of the policy function. The value of parameter $\Theta$ of the policy function after learning is read from the main memory 36, and the read value of parameter $\Theta$ is transmitted from the learning device 30 to the control target 10. The control target 10 can realize a desired operation by executing an action using the value of parameter $\Theta$ of the policy function.

The control target 10 to which the learning result is applied only needs to perform a part of the processing of the learning device 30. For example, the control target 10 may receive the current sensor data and the value of the previous auxiliary variable value (equivalent to steps S102 and S104). The control target 10 may obtain a score by a policy function based on the received data (equivalent to step S106). The control target 10 may select the current action according to the score (equivalent to step S112). The control target 10 may executes the selected current action (equivalent to step S114). Unlike the learning device 30, the control target 10 that does not learn but uses the learning result does not need to calculate reward and update parameter (equivalent to steps S118 and S122).

Furthermore, the control target 10 may not increase the degree in which the previous action is selected as the current action in the action selection process. Increasing the degree of selection includes increasing the score for the previous action and using the same value as the value of the previous auxiliary variable as the value of the current auxiliary variable. Not increasing the degree in which the previous action is selected as the current action is equivalent to, for example, setting the period T to a value smaller than 1 in the action selection process according to the first embodiment.

Further, the control target 10 using the learning result may select an action having the highest score for the action among the actions as the current action in the action selection process.

Effect of First Embodiment

The effects of the first embodiment will be described. As a first comparative example, a reinforcement learning method is assumed. In the method, the current sensor data is received, the current action is selected based on the current sensor data, the selected action is executed by the control target 10, the reward and the next sensor data are received, and the value of the parameter is updated based on the reward and next sensor data. In the first comparative example, the action is selected based on the current sensor data regardless of which action was selected in the previous action selection. Therefore, if the response time of the control target is longer than the action selection cycle, it becomes difficult to realize an operation corresponding to the selected action, and learning becomes difficult.

Figure 7:
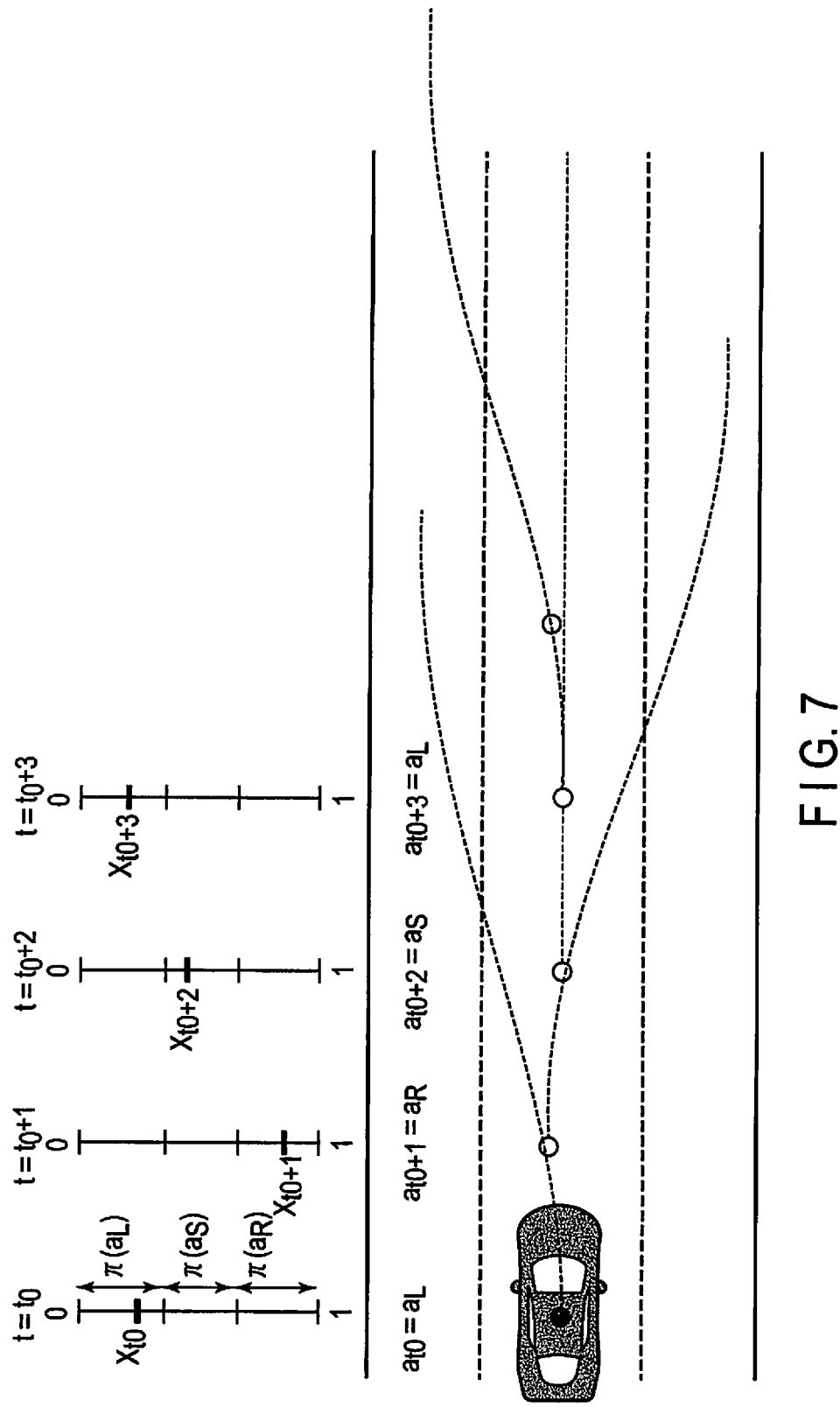
FIG. 7 is a diagram illustrating a learning result according to a first comparative example.

An example of learning in the first comparative example is illustrated in FIG. 7. It is assumed that the control target 10 is an automobile driving on a road having a plurality of lanes, and learning for autopilot is performed. Here, the response time of the automobile corresponds to a plurality of action selection cycles.

In the example of FIG. 7, at t=t0, a "change to left lane" action $a_L$ is selected and executed, at t=t0+1, a "change to right lane" action $a_R$ is selected and executed, at t=t0+2, a "straight ahead" action $a_S$ is selected and executed, and at t=t0+3, a "change to left lane" action $a_L$ is selected and executed. As described above, since the actions selected in each action selection cycle are not consistent, operations corresponding to the action selection such as "change to left lane" and "change to right lane" are not realized. In the reinforcement learning method, based on the relationship between the action selected in the state of the control target at each time point and the state of the surrounding environment, and the reward obtained from the action, an appropriate action for each state at each time is learned. Therefore, if an operation corresponding to the selected action is not sufficiently realized and the relationship between the action and the reward is ambiguous, an appropriate learning is not performed. Especially when searching for actions is actively performed, such as in the initial stage of learning, since scores for a plurality of actions are close to equal, these problems are likely to occur.

As another second comparative example, a reinforcement learning method is assumed. In the method, the current sensor data is received, the action is selected based on the current sensor data, the selected action is repeatedly executed several times, the reward and the next sensor data are received, and the value of the parameter is updated based on the reward and the next sensor data. In the second comparative example, if the cycle of action selection is set to be approximately the same as the response time of the control target, and the current action is repeatedly executed several times during the period corresponding to the response time, an operation corresponding to the selected action can be realized. However, in this case, once the action is selected, since no action is selected during the period corresponding to the response time of the control target, it is not possible to cope with environmental changes that occur in a period shorter than the period corresponding to the response time.

Figure 8:
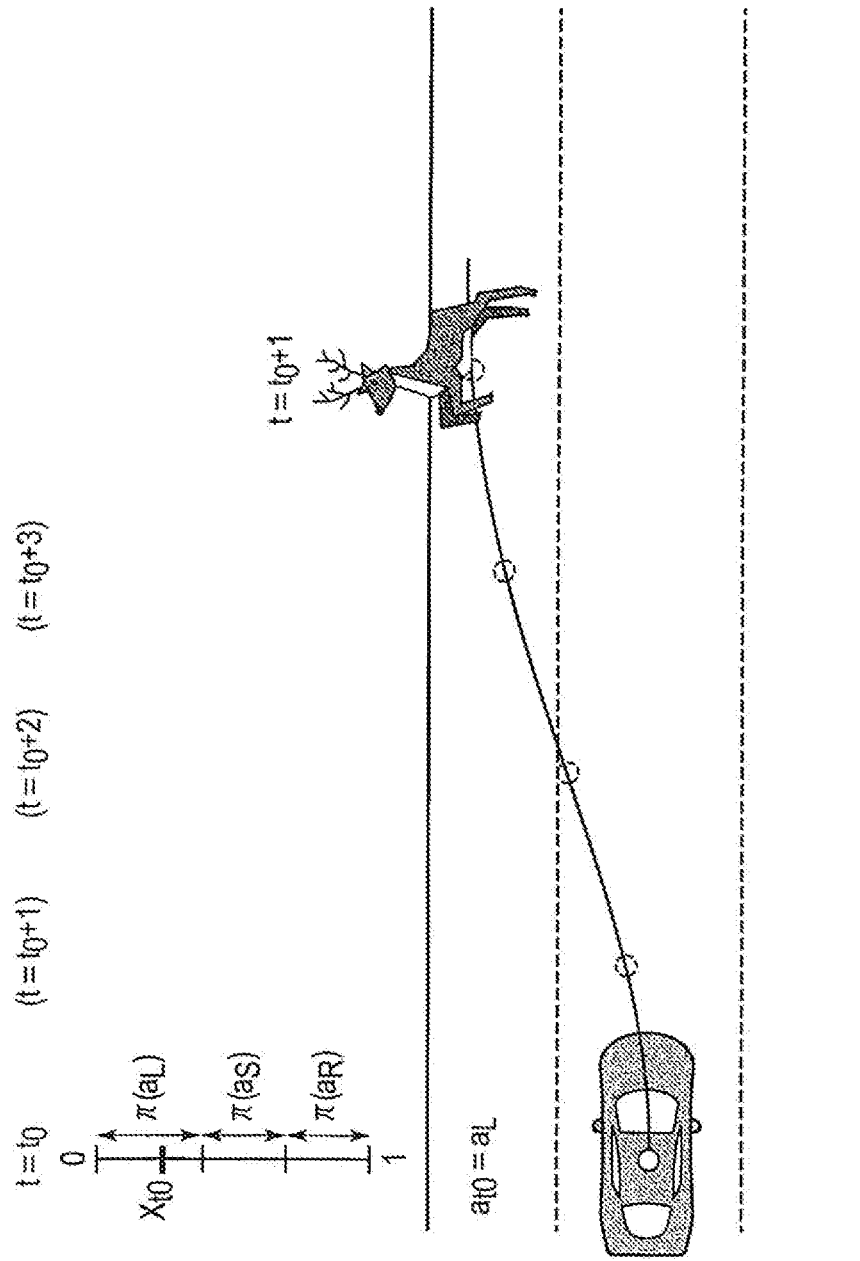
FIG. 8 is a diagram illustrating a learning result according to a second comparative example.

FIG. 8 illustrates an example of the learning result of the second comparative example. In the second comparative example, it is assumed that time is normalized in the action execution cycle, that is, the control cycle. In FIG. 8, it is assumed that the cycle of the action selection is a period (=4) corresponding to the period from selecting an action of lane change of an automobile to completing the operation of lane change of the automobile, and the number of times of repeated executions of the action is set to the number of times corresponding to the period (=4). At the time of action selection ($t=t_0$), there are no obstacles on the road, and therefore there is no problem even if the action $a_L$ of "change to left lane" is selected at $t=t0$. However, if an obstacle appears on the road before the next action selection cycle ($t=t0+4$) after making this action selection, in the meantime, any action selection is not performed, it is impossible to cope with the appearance of the obstacle.

As described above, in the second comparative example, it is not possible to cope quickly with an environmental change that occurs in a period shorter than the response time of the control target. That is, in the second comparative example, it is not possible to learn action selection that can quickly respond to an environmental change that occurs in a period shorter than the response time of the control target. Further, in the second comparative example, while the current action is repeatedly executed, action selection is not performed and the value of the parameter is not updated based on the next observation result and reward. Therefore, the efficiency of updating the value of the parameter is low, and learning is slow.

Figure 9:
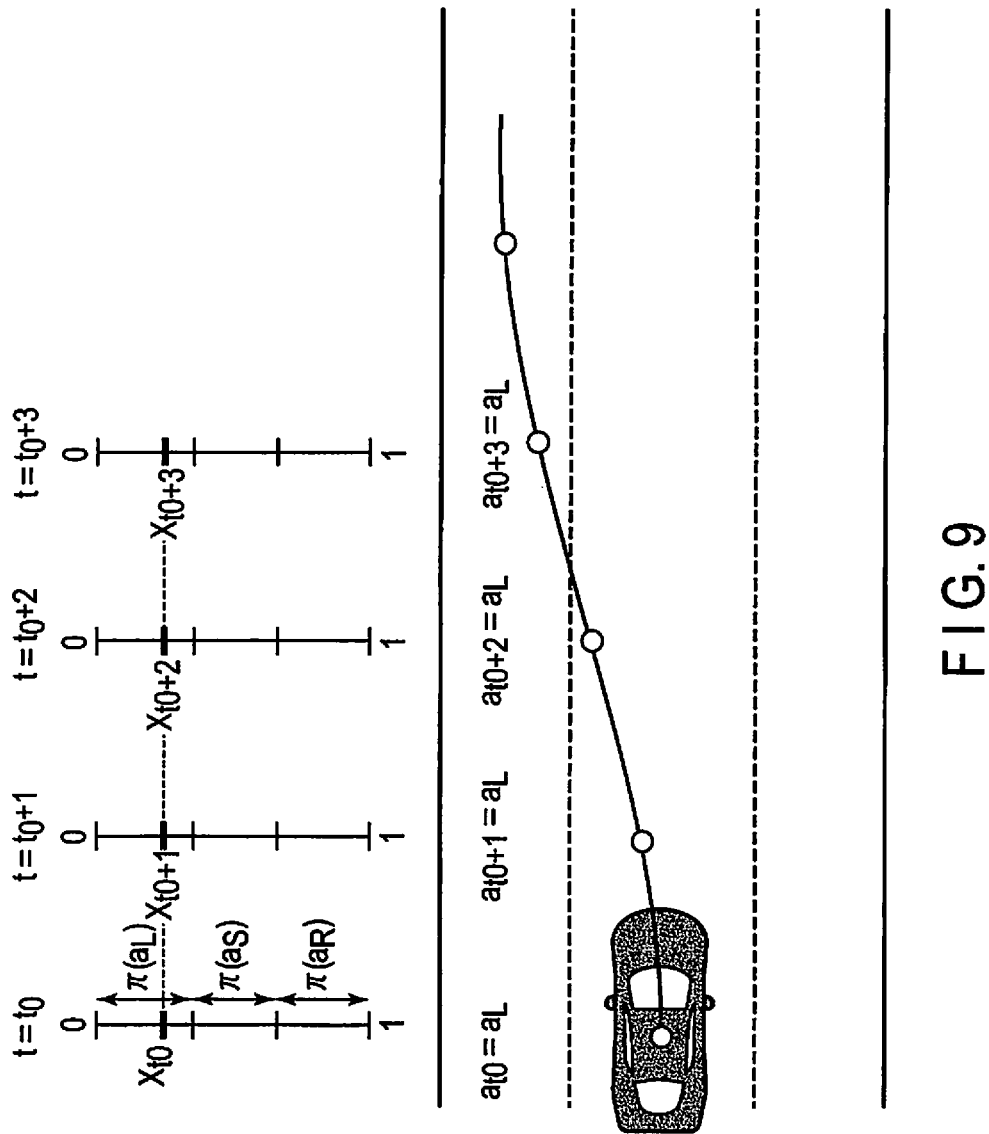
FIG. 9 is a diagram illustrating an example of a learning result according to the first embodiment.

For these first and second comparative examples, according to the machine learning method of the first embodiment, it is possible to learn action selection that can quickly respond to the environmental change, even for a control target with a long response time. An example of learning in the first embodiment is illustrated in FIG. 9. In the first embodiment, the degree of selecting the previous action as the current action is large in the action selection process. Even if the scores for several actions are nearly equal when searching for actions is actively performed such as in the initial stage of learning, as shown in FIG. 9, consistency is likely to appear in the action selected in each action selection ("change to left lane" $a_L$).

Therefore, even if the action selection cycle is shorter than the response time of the control target, it is easy to realize an operation corresponding to the selected action. Therefore, even if the action selection cycle is shorter than the response time of the control target, the relationship between the selected action and the reward obtained from the action becomes clear. Therefore, the value of the parameter such as the policy function is appropriately updated. It becomes possible to learn appropriate actions and action selections for the state of the control target at each time point and the state of the surrounding environment. For example, if the reward to be obtained from the present to the future due to execution of an action is relatively large, by updating the value of the parameter of the policy function, learning is performed such that the score for the action is relatively large. On the other hand, if the reward to be obtained from the present to the future due to execution of an action is relatively small, by updating the value of the parameter of the policy function, learning is performed such that the score for the action is relatively small. In this way, the score for an action increases or decreases by learning.

Figure 10:
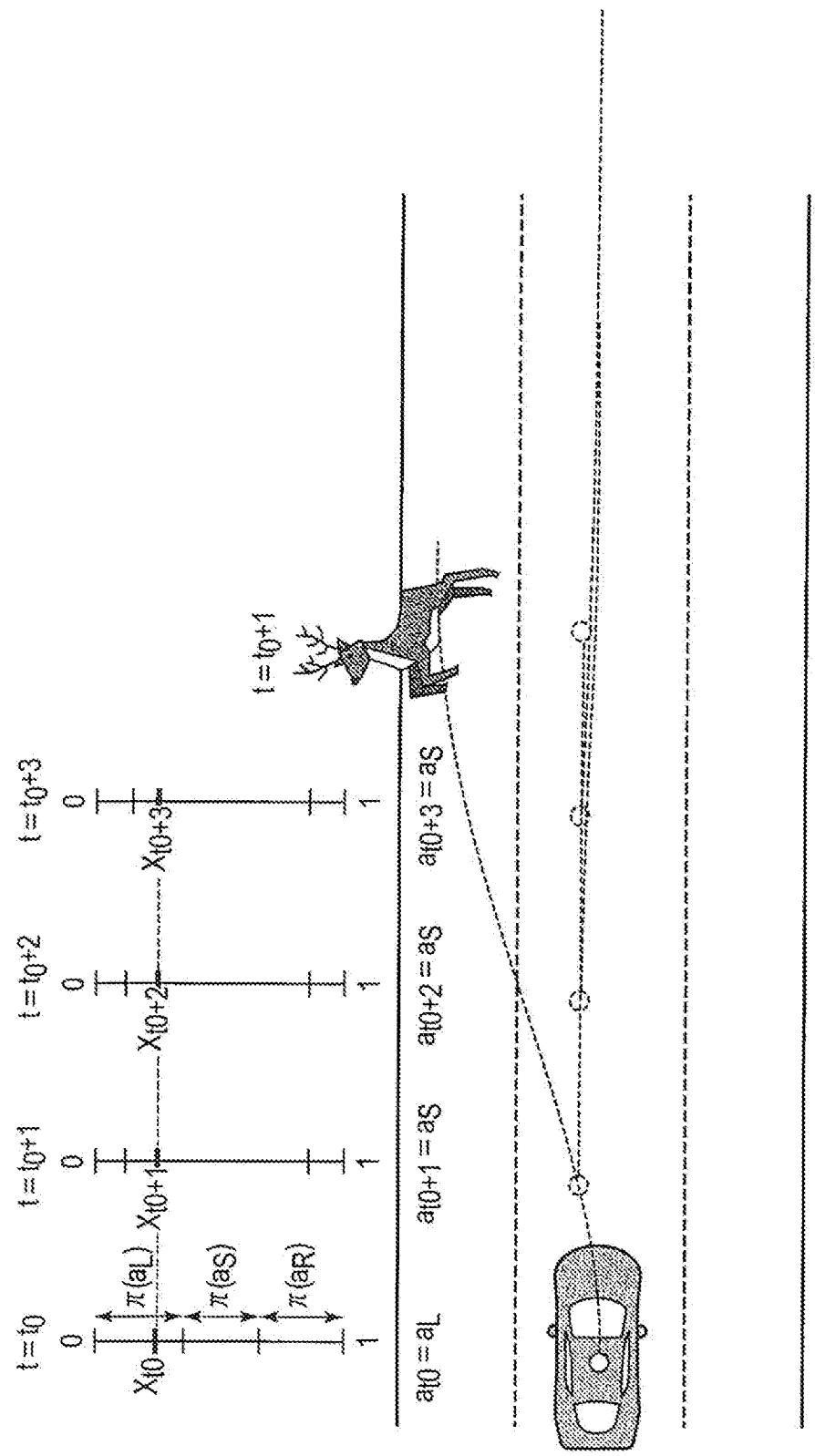
FIG. 10 is a diagram illustrating another example of a learning result according to the first embodiment.

According to the machine learning method of the first embodiment, such learning is possible even if the action selection cycle is shorter than the response time of the control target. Therefore, as illustrated in FIG. 10, even if an obstacle appears on the road at $t=t0+1$ after selecting the action of "change to left lane" $a_L$ at $t=t0$, it is possible to select an appropriate action as for the state of the control target and state of the surrounding environment at $t=t0+1$. This is because, in the machine learning method according to the first embodiment, as described above, even if the action selection cycle is shorter than the response time of the control target, it is possible to learn an appropriate action of avoiding an obstacle ahead, and thus such an action can be selected at $t=t0+1$. As described above, according to the machine learning method of the first embodiment, even if the cycle of action selection is shorter than the response time of the control target, appropriate action learning is possible, and therefore action selection that can quickly respond to the environment change that occur during a period shorter than the response time of the control target can be learned.

As a modification of the second comparative example, the third comparative example will be described. In the third comparative example, the current sensor data is received, the current action and the number of times of repeated execution of the action are selected based on the current sensor data, the selected action is repeatedly executed for the selected number of times, the reward and the next sensor data are received, and the value of the parameter is updated based on reward and next sensor data. In the third comparative example, as in the second comparative example, while the current action is repeatedly executed, action selection is not performed and the value of the parameter is not updated based on the next observation result and reward. Therefore, update efficiency of the value of the parameter is poor, and learning is slow.

On the other hand, in the machine learning method according to the first embodiment, for each cycle of the action selection, action selection is performed and the value of the parameter is updated based on the next observation result and reward. Compared to the second and third comparative examples, updating of the value of the parameter is more efficiently performed and learning can be performed more efficiently in the machine learning method according to the first embodiment.

As described above, the machine learning method according to the first embodiment performs, for each action selection cycle:

(i) a process of receiving the current sensor data $O_{t0}$ and the previous auxiliary variable value $X_{t0-1}$;

(ii) an action selection process for selecting the current action based on the previous auxiliary variable value $X_{t0-1}$, the current sensor data $O_{t0}$, and the value of parameter $\Theta$;

(iii) a process of causing the control target 10 to execute the current action;

(iv) a process of receiving the next sensor data $O_{t0+1}$ and reward $r_{t0}$; and (v) a process of updating the value of parameter $\Theta$ based on the current sensor data $O_{t0}$, the action information $A_{t0}$ regarding the current action, the next sensor data $O_{t0+1}$, and the reward $r_{t0}$.

Examples of the control target 10 include moving objects such as automobiles, robots, and drones, and movable objects such as robot arms. Thereby, according to the state of the control target and the state of the environment surrounding the control target, learning about execution or selection of an appropriate action can be performed. Therefore, even if the response time of the control target 10 is long, learning for action execution or action selection that can respond quickly to environmental changes is possible.

Second Embodiment

According to the learning method of the first embodiment, the current sensor data $O_{t0}$ and the previous auxiliary variable value $X_{t0-1}$ are received, and the current action is selected based on the value of the previous auxiliary variable value $X_{t0-1}$, the current sensor data $O_{t0}$, and the value of parameter $\Theta$. A second embodiment relating to the modification of the action selection of the first embodiment will be described. According to a learning method of the second embodiment, current sensor data and action information of a previous action are received, a set of mixed scores is obtained based on a set of current scores and the action information of the previous action, a current action is selected based on the set of mixed scores and a current auxiliary variable value.

Since the configuration of a learning device and a control target of the second embodiment is the same as the configuration of the first embodiment illustrated in FIG. 1, the description thereof will be omitted.

A machine learning method according to the present embodiment includes:

(i) a receiving process of receiving action information of a previous action and current sensor data;

(ii) an action selection process of selecting a current action based on the action information, the current sensor data, and the value of the parameter;

(iii) a process of executing the current action;

(iv) a process of receiving next sensor data and reward; and (v) a process of updating the value of the parameter based on the current sensor data, the current action, the next sensor data, and the reward.

Figure 11:
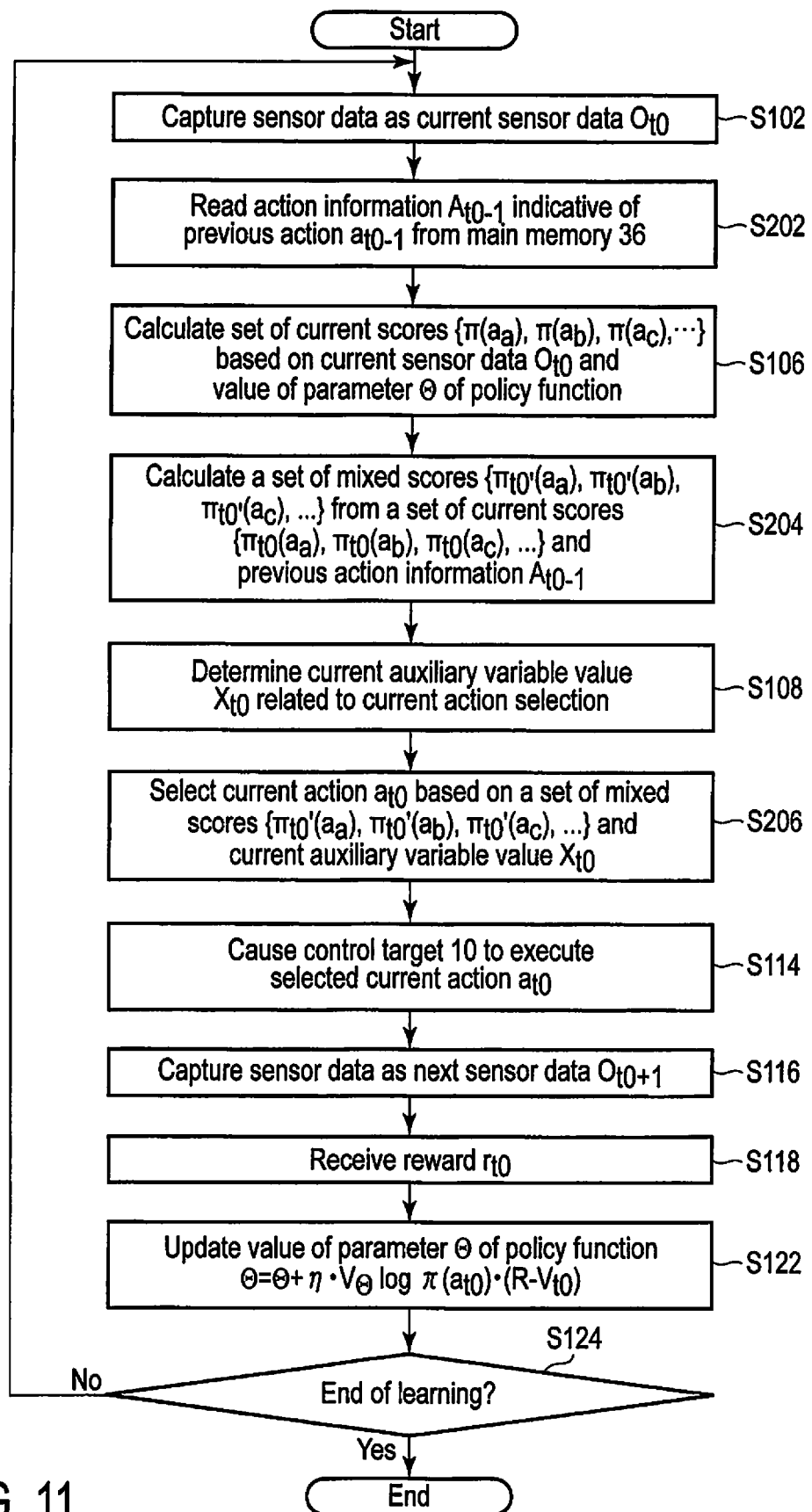
FIG. 11 is a flowchart illustrating an example of a machine learning method according to a second embodiment.

FIG. 11 is a flowchart illustrating an example of the learning method according to the second embodiment. The same steps as those in the flowchart of the first embodiment shown in FIG. 2 are denoted by the same reference numerals, and detailed description thereof will be omitted. The flowchart of FIG. 11 is also periodically executed at every action selection timing.

[Preprocessing]

Preprocessing of the second embodiment is the same as the preprocessing of the first embodiment. In step S102, the processor 32 captures current sensor data $O_{t0}$ and writes it in the main memory 36. In step S202, the processor 32 reads action information $A_{t0-1}$ indicative of a previous action $a_{t0-1}$ selected in a previous action selection process from the main memory 36.

[Action Selection Process]

Next, an action selection process is executed. According to the action selection process of the second embodiment, a current action is selected based on a previous action, current sensor data, and the value of the parameter. The action selection process according to the second embodiment includes:

(i) a process of calculating a set of current scores related to selection of a current action from current sensor data and the value of the parameter;

(ii) a process of calculating a set of mixed scores from the set of current scores and a previous action;

(iii) a process of calculating a current auxiliary variable value related to the selection of the current action; and (iv) a process of selecting the current action based on the set of mixed scores and the current auxiliary variable value.

In the process (ii) of calculating the set of mixed scores from the set of current scores and the previous action, the set of current scores is mixed with a set of scores in which the score of the previous action is made larger than scores of other actions, and the action is selected based on the set of mixed scores. Therefore, the degree in which the previous action is selected as the current action increases.

Specifically, in step S106, from the current sensor data $O_{t0}$ and the value of parameter $\Theta$ of the policy function, the processor 32 calculates the set of current scores $\{\pi_{t0}(a_a), \pi_{t0}(a_b), \pi_{t0}(a_c), \ldots\}$ respectively for actions $a_a, a_b, a_c, \ldots$ that can be executed by the control target 10.

In step S204, the processor 32 calculates a set of mixed scores $\{\pi_{t0}'(a_a), \pi_{t0}'(a_b), \pi_{t0}'(a_c), \ldots\}$ for each action $a_a, a_b, a_c, \ldots$ from the set of current scores $\{\pi_{t0}(a_a), \pi_{t0}(a_b), \pi_{t0}(a_c), \ldots\}$ and the previous action information $A_{t0-1}$.

Figure 12:
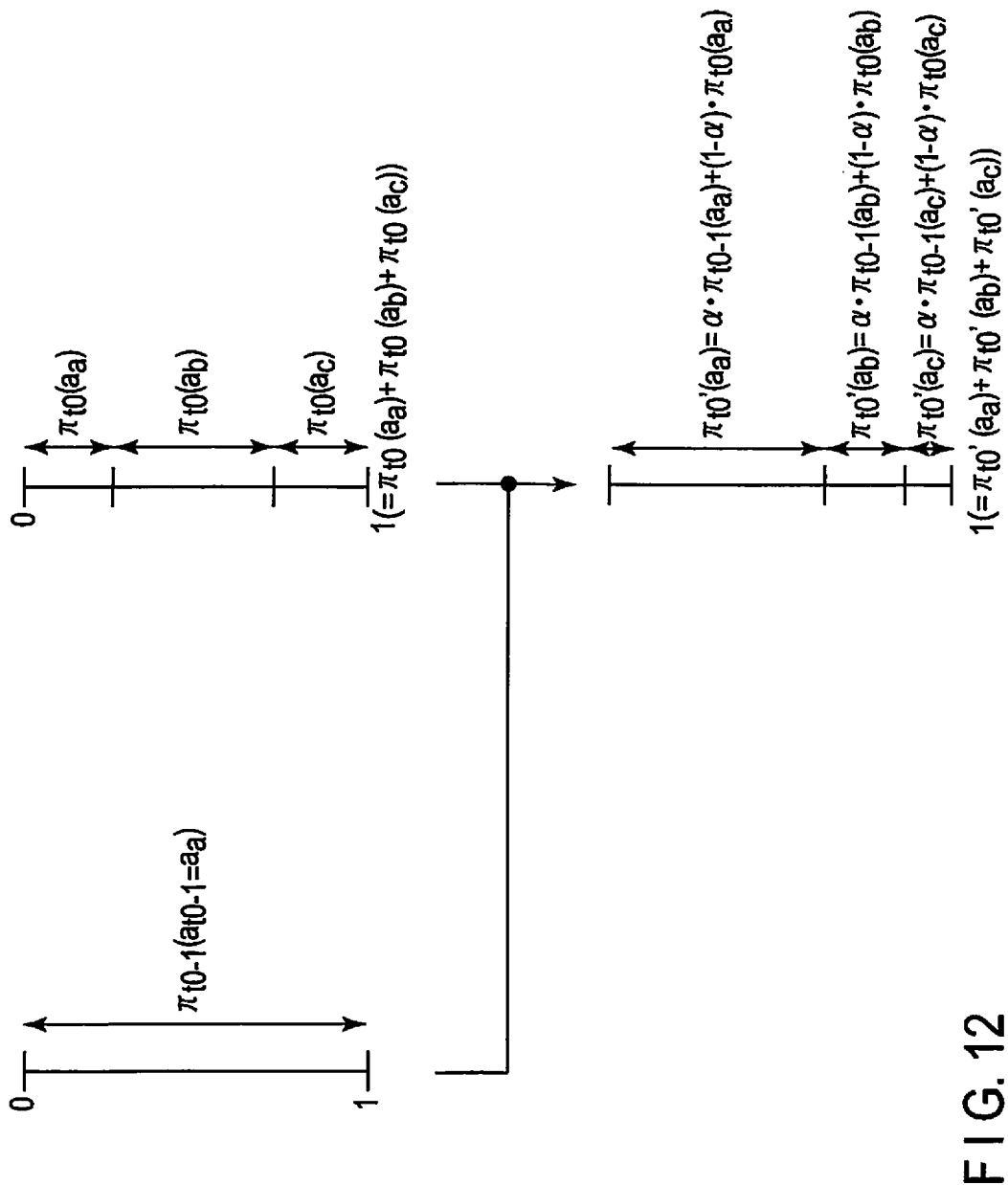
FIG. 12 is a diagram illustrating an example of a method for obtaining a set of mixed scores used for action selection in the second embodiment.

FIG. 12 illustrates a calculation example of the mixed score. The processor 32 creates a set of scores $\{\pi_{t0-1}(a_a), \pi_{t0-1}(a_b), \pi_{t0-1}(a_c), \ldots\}$ from the previous action information $A_{t0-1}$ in which the previous action is $a_a$, the score for the executed action is $\pi_{t0-1}(a_a)=1$, and the scores for other actions $a_b, a_c, \ldots$ that have not been executed are $\pi_{t0-1}(a_b)=\pi_{t0-1}(a_c)=\ldots=0$. In the set of scores, the score for the executed previous action is larger than the scores for other actions that have not been executed. In the example of FIG. 12, the score for the previous action is 1, and the scores for the other actions are 0. However, the score for the previous action only needs to be larger than the scores for the other actions. The score for the previous action may be less than 1 or greater than 0.

The processor 32 mixes the set of current scores $\{\pi_{t0}(a_a), \pi_{t0}(a_b), \pi_{t0}(a_c), \ldots\}$ and the set of scores in which the score for the previous action is larger than the scores for the other actions $\{\pi_{t0-1}(a_a), \pi_{t0-1}(a_b), \pi_{t0-1}(a_c), \ldots\}$ using a mixing ratio $\alpha$ to calculate the set of mixed score $\{\pi_{t0}'(a_a), \pi_{t0}'(a_b), \pi_{t0}'(a_c), \ldots\}$.

The set of mixed scores is calculated by calculating the score of each action $a_a, a_b, a_c, \ldots$ in the set of mixed scores as shown in Equations 5, 6, 7, . . . .

$$\pi_{t0}'(a_a) = \alpha \cdot \pi_{t0-1}(a_a) + (1-\alpha) \cdot \pi_{t0}(a_a) \quad \text{Equation 5}$$

$$\pi_{t0}'(a_b) = \alpha \cdot \pi_{t0-1}(a_b) + (1-\alpha) \cdot \pi_{t0}(a_b) \quad \text{Equation 6}$$

$$\pi_{t0}'(a_c) = \alpha \cdot \pi_{t0-1}(a_c) + (1-\alpha) \cdot \pi_{t0}(a_c) \quad \text{Equation 7}$$

. . .

Here, $\pi_{t0}(a_a)$, $\pi_{t0}(a_b)$, and $\pi t_0(a_c)$ indicate the current score of the actions $a_a$, $a_b$, and $a_c$. $\pi_{t0-1}(a_a)$, $\pi_{t0-1}(a_b)$, and $\pi_{t0-1}(a_c)$ indicate the score of the current actions $a_a$, $a_b$, and $a_c$ in the set of scores that made the score for the previous action larger than the scores for the other actions. $\pi_{t0}'(a_a)$, $\pi_{t0}'(a_b)$, and $\pi_{t0}'(a_c)$ indicate the scores of the actions $a_a$, $a_b$, and $a_c$ in the set of the calculated mixed scores.

The mixing rate $\alpha$ may be constant during the learning period, may be changed randomly during the learning period, or may be gradually decreased during the learning period.

In step S108, the processor 32 determines a current auxiliary variable value $X_{t0}$ related to the current action selection, and writes the current auxiliary variable value $X_{t0}$ in the main memory 36.

The processor 32 selects a current action $a_{t0}$ in step S206, based on the set of mixed scores $\{\pi_{t0}'(a_a), \pi_{t0}'(a_b), \pi_{t0}'(a_c), \ldots\}$ and the current auxiliary variable value $X_{t0}$. The processor 32 writes the action information $A_{t0}$ indicative of the selected action $a_{t0}$ in the main memory 36.

Thus, in the action selection process according to the second embodiment, in the same process as the process of selecting the current action based on the set of current scores and the current auxiliary variable value in the first embodiment, the current action is selected using the set of mixed scores instead of the set of current scores.

[Action Execution Process and Learning Process]

The action execution process and the learning process according to the second embodiment are the same as the action execution process and the learning process according to the first embodiment. In step S114, the processor 32 causes the control target 10 to execute the selected action. The processor 32 executes a learning process in steps S116, S118, and S122.

[Effect]

Thus, in the action selection process of the second embodiment, a set of scores in which the score for the previous action is made larger than the scores for the other actions is mixed with the set of current scores, and the mixed score is calculated. By selecting the current action based on the mixed score and the current auxiliary variable value, the degree in which the previous action is selected as the current action increases. When the degree of selecting the previous action as the current action is not increased, the value of the set of mixed scores may be set to be the same as the value of the set of current scores.

The period during which the previous action is selected as the current action may be constant during the learning period, and it may be changed randomly during the learning period or gradually shortened during the learning period. In addition, this period may be substantially equal to the time required from the start of executing the selected action to the realization of the operation of the control target corresponding to the selected action, that is, the response time of the control target to the selected action.

Third Embodiment

In the second embodiment, an example has been described in which a set of mixed scores is calculated by mixing a set of current scores and a set of scores in which a score for a previous action is larger than a score for another action. A third embodiment will be described as a modification of the second embodiment. When a mixed score is calculated, if a score for the previous action is sufficiently large in a set of the previous set, the set of previous scores may be used instead of the set of scores in which the score for the previous action is made larger than the scores for other actions. That is, in the set of previous scores, when the score for the previous action is sufficiently large, the set of current scores and the set of previous scores may be mixed to calculate a set of mixed scores. The third embodiment is a modification example of the calculation of mixed scores of the second embodiment.

Since the configuration of a learning device and a control target of the third embodiment is the same as the configuration of the first embodiment illustrated in FIG. 1, the description thereof will be omitted.

Figure 13:
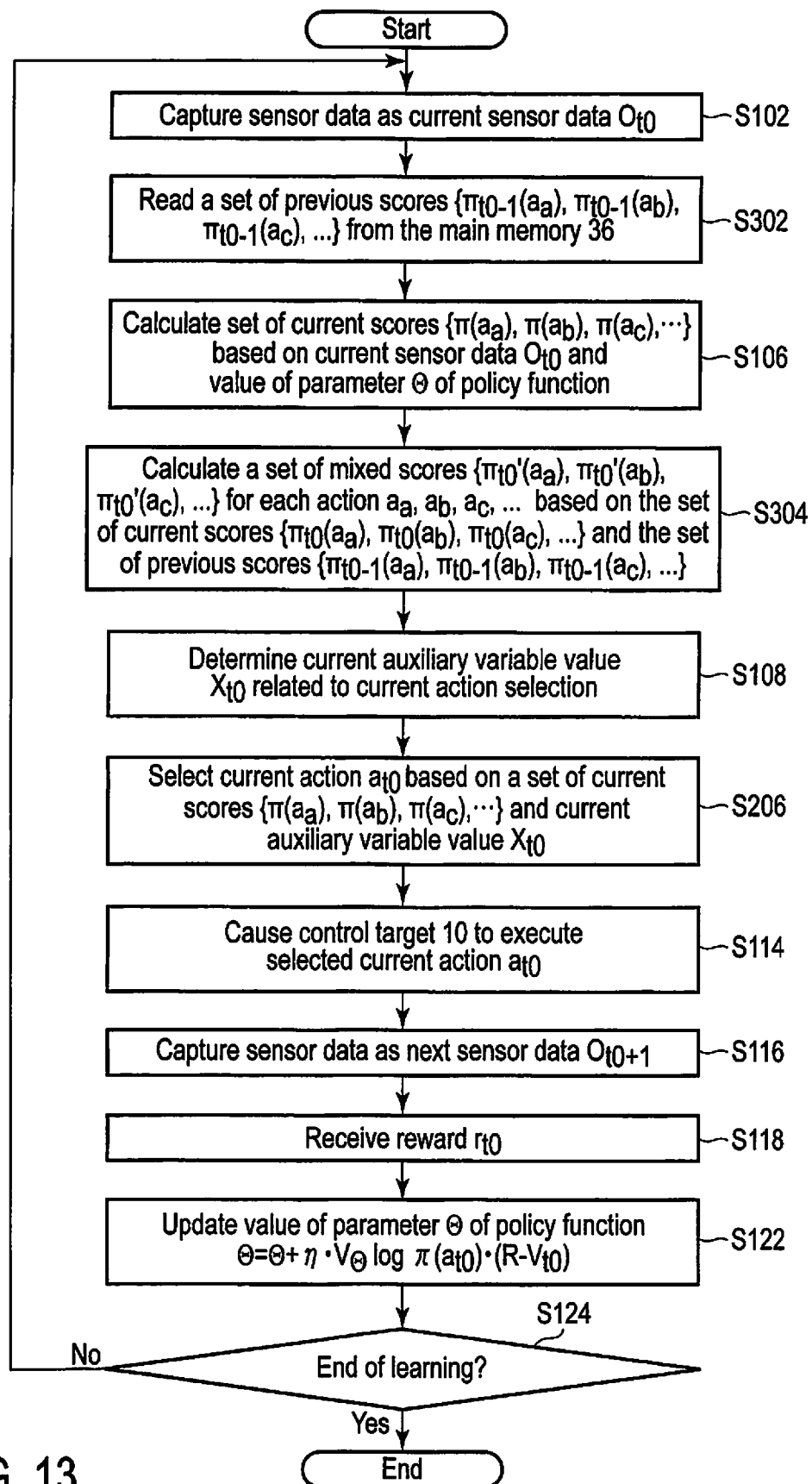
FIG. 13 is a flowchart illustrating an example of a machine learning method according to a third embodiment.

FIG. 13 is a flowchart illustrating an example of the learning method according to the third embodiment. The same steps as those in the flowchart of the first embodiment shown in FIG. 2 are denoted by the same reference numerals, and detailed description thereof will be omitted. The flowchart of FIG. 13 is also periodically executed at every action selection timing.

[Preprocessing]

In step S102, the processor 32 captures current sensor data $O_{t0}$ and writes it in a main memory 36. Then, in step S302, the processor 32 reads a set of previous scores $\{\pi_{t0-1}(a_a), \pi_{t0-1}(a_b), \pi_{t0-1}(a_c), \ldots\}$ from the main memory 36.

[Action Selection Process]

In step S106, based on the current sensor data $O_{t0}$ and the value of parameter $\Theta$ of the policy function, the processor 32 calculates a set of current scores $\{\pi_{t0}(a_a), \pi_{t0}(a_b), \pi_{t0}(a_c), \ldots\}$ respectively for actions $a_a$, $a_b$, $a_c$, . . . that can be executed by a control target 10.

In step S304, the processor 32 calculates a set of mixed scores $\{\pi_{t0}'(a_a), \pi_{t0}'(a_b), \pi_{t0}'(a_c), \ldots\}$ for each action $a_a$, $a_b$, $a_c$, . . . based on the current set of scores $\{\pi_{t0}(a_a), \pi_{t0}(a_b), \pi_{t0}(a_c), \ldots\}$ and the set of previous scores $\{\pi_{t0-1}(a_a), \pi_{t0-1}(a_b), \pi_{t0-1}(a_c), \ldots\}$.

Figure 14:
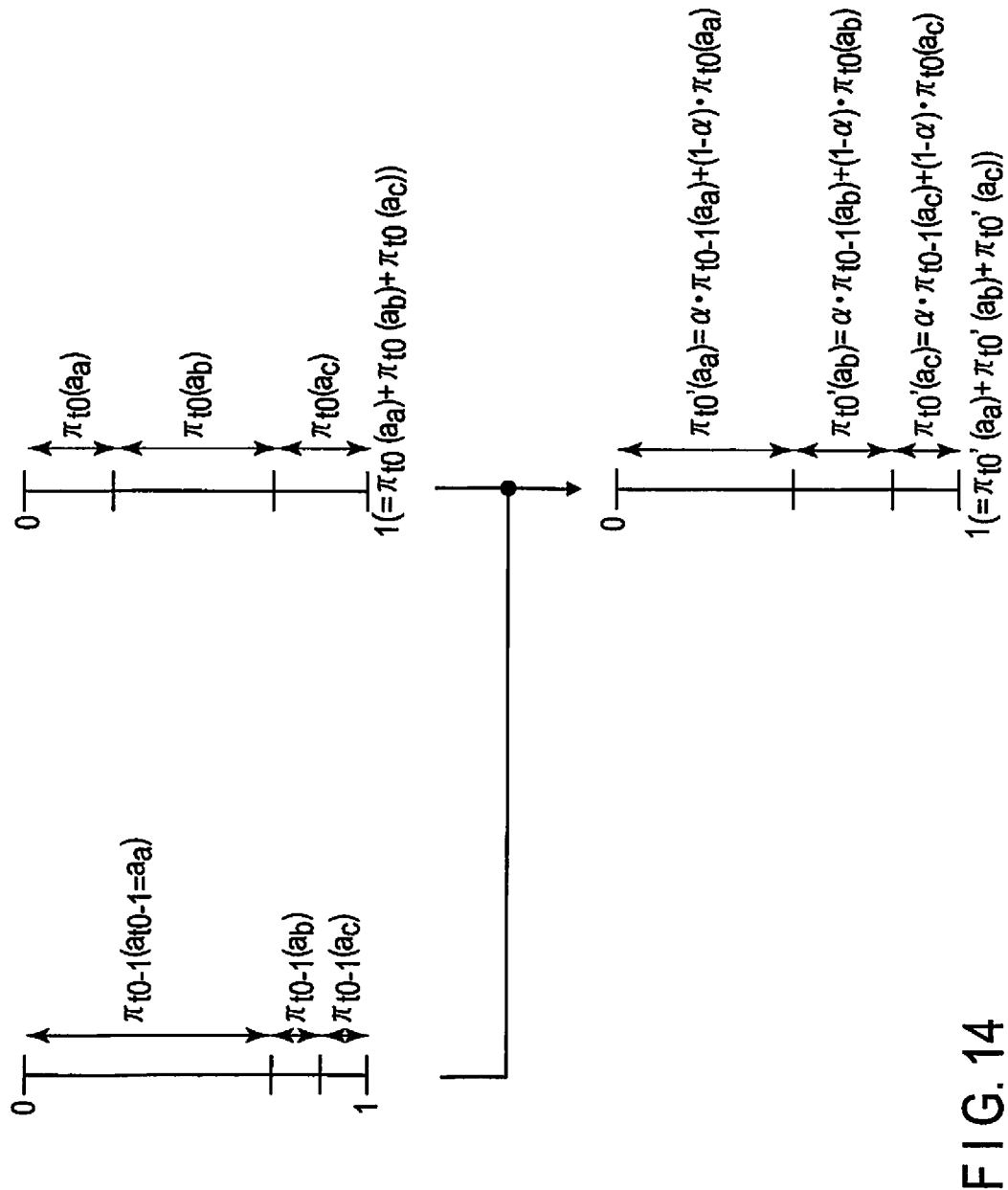
FIG. 14 is a diagram illustrating an example of a method for obtaining a set of mixed scores used for action selection in the third embodiment.

FIG. 14 illustrates a calculation example of the mixed score. The processor 32 mixes the set of current scores $\{\pi_{t0}(a_a), \pi_{t0}(a_b), \pi_{t0}(a_c), \ldots\}$ and the set of previous scores $\{\pi_{t0-1}(a_a), \pi_{t0-1}(a_b), \pi_{t0-1}(a_c), \ldots\}$ using the mixing ratio $\alpha$, and calculates a set of mixed scores $\{\pi_{t0}'(a_a), \pi_{t0}'(a_b), \pi_{t0}'(a_c), \ldots\}$ as indicated in Equations 5, 6, and 7. In the previous set of scores $\{\pi_{t0-1}(a_a), \pi_{t0-1}(a_b), \pi_{t0-1}(a_c), \ldots\}$, it is assumed that the score for one action, for example, the action $a_a$, is larger than the score for another action.

In step S108, the processor 32 determines a current auxiliary variable value $X_{t0}$ related to the current action selection, and writes the current auxiliary variable value $X_{t0}$ in the main memory 36.

The processor 32 selects a current action $a_{t0}$ in step S206, based on the set of mixed scores $\{\pi_{t0}'(a_a), \pi_{t0}'(a_b), \pi_{t0}'(a_c), \ldots\}$ and the current auxiliary variable value $X_{t0}$, and the action information $A_{t0}$ indicative of the selected action $a_{t0}$ is written in the main memory 36.

Thus, in the action selection process according to the third embodiment, in the same process as the process of selecting the current action based on the set of current scores and the current auxiliary variable value in the first embodiment, the current action is selected using the set of mixed scores instead of the set of current scores.

[Action Execution Process and Learning Process]

The action execution process and the learning process according to the third embodiment are the same as the action execution process and the learning process according to the first and second embodiments. In step S114, the processor 32 causes the control target 10 to execute the selected action. The processor 32 executes a learning process in steps S116, S118, and S122.

[Effect]

Thus, in the action selection process of the third embodiment, the set of current scores is mixed with the set of previous scores to calculate the mixed score, and by selecting the current action based on the mixed score and the current auxiliary variable value, the degree in which the previous action is selected as the current action increases. When the degree of selecting the previous action as the current action is not increased, the value of the set of mixed scores may be set to be the same as the value of the set of current scores.

Fourth Embodiment

The first to third embodiments relate to an embodiment of a machine learning method in the actor critic method. As the fourth embodiment, an embodiment related to a value-based reinforcement learning method such as the SARSA method or the Q learning method will be described.

Preprocessing of the fourth embodiment is the same as the preprocessing of the first to third embodiments.

In an action selection process, a processor 32 calculates action values $Q(a_a)$, $Q(a_b)$, $Q(a_c)$, ... for each action based on current sensor data $O_{r0}$ and the value of parameter $\Theta$ of the action value function. The action value $Q(a_i)$ indicates an estimated value of a reward to be obtained from the present to the future due to execution of the action $a_i$. An example of the action value function is a neural network illustrated in FIG. 15.

The processor 32 calculates scores $\pi(a_a)$, $\pi(a_b)$, $\pi(a_c)$, ... for each action based on the action values $Q(a_a)$, $Q(a_b)$, $Q(a_c)$, .... Specifically, the processor 32 calculates the score $\pi(a_i)$ for the action $a_i$ by a softmax function of an action value as indicated by Equation 8.

$$\Pi(a_i) = \frac{\exp(Q(a_i))}{\sum_j^K \exp(Q(a_j))} \quad \text{Equation 8}$$

The processor 32 determines a current auxiliary variable value $X_{r0}$ related to the current action selection by the same process as step S108 of the first embodiment.

By processing similar to the action selection process according to the first to third embodiments, the processor 32 selects the current action $a_{r0}$ based on the score $\pi(a_a)$, $\pi(a_b)$, $\pi(a_c)$, ... for each action and the current auxiliary variable value $X_{r0}$. The processor 32 writes the action information $A_{r0}$ indicative of the selected action $a_{r0}$ in the main memory 36.

The processor 32 causes the control target 10 to execute the current action $a_{r0}$ by the same process as step S114 of the first embodiment.

The processor 32 receives the next sensor data and reward by processes similar to steps S116 and S118 of the first embodiment.

The parameter update process of the present embodiment is different from the parameter update processes of the first to third embodiments. When updating the value of the parameter, the processor 32 selects a next action $a_{r0+1}$ based on the next sensor data $O_{r0+1}$ and the value of parameter $\Theta$ of the action value function. In the SARSA method, the processor 32 selects the next action $a_{r0+1}$ by the same processing as the action selection process according to the first to third embodiments based on the next sensor data $O_{r0+1}$ and the value of parameter $\Theta$ of the action value function. In the Q learning method, the processor 32 calculates the action values $Q(a_a a)$, $Q(a_b)$, $Q(a_c)$, ... for each action based on the following sensor data $O_{r0+1}$ and the value of parameter $\Theta$ of the action value function by the same process as the action selection process according to the first to third embodiments. The processor 32 selects the action having the highest action value for the action among the actions as the next action $a_{r0+1}$.

The processor 32 updates the value of parameter $\Theta$ of the action value function as in the following equation, based on the action value $Q(a_{r0})$ of the current action $a_{r0}$ calculated in the above processing, the reward $r_{r0}$, and the action value $Q(a_{r0+1})$ of the next action $a_{r0+1}$.

$$\Theta = \Theta - \eta \cdot \nabla_\Theta (r_{r0} + \gamma \cdot Q(a_{r0+1}) - Q(a_{r0}))^2 \quad \text{Equation 9}$$

In the above equation, $\gamma$ is a discount rate, and $r_i$ is a learning rate.

Fifth Embodiment

The fourth embodiment exemplifies a machine learning method that calculates a score for each action using the softmax function of an action value for each action in a value-based reinforcement learning method. A modified example of the score calculation of the fourth embodiment will be described as a fifth embodiment. In the fifth embodiment, a machine learning method for calculating a score according to a format called an ε-greedy policy will be described.

Preprocessing of the fifth embodiment is the same as the preprocessing of the first to fourth embodiments.

In the action selection process, by the same processing as the action selection process according to the fourth embodiment, a processor 32 calculates action values $Q(a_a)$, $Q(a_b)$, $Q(a_c)$, ... for each action based on current sensor data $O_{r0}$ and the value of parameter $\Theta$ of the action value function. The processor 32 calculates scores $\pi(a_a)$, $\pi(a_b)$, $\pi(a_c)$, ... for each action based on the action values $Q(a_a)$, $Q(a_b)$, $Q(a_c)$, ... as indicated in FIG. 16. FIG. 16 shows an example in which the action value for the action $a_a$ is the largest among the actions. The processor 32 sets $(1-\varepsilon)+\varepsilon/K$ as a score for an action having the largest action value for each action among the actions, and $\varepsilon/K$ as a score for other actions. Here, ε is a real number. K is the total number of actions that can be selected, and K=3 in the example of FIG. 16.

The processor 32 determines a current auxiliary variable value $X_{r0}$ related to the current action selection by the same process as step S108 of the first embodiment.

By processing similar to the action selection process according to the first to third embodiments, the processor 32 selects the current action $a_{r0}$ based on the score $\pi(a_a)$, $\pi(a_b)$, $\pi(a_c)$, ... for each action and the current auxiliary variable value $X_{r0}$. The processor 32 writes the action information $A_{r0}$ indicative of the selected action in the main memory 36.

The processor 32 causes the control target 10 to execute the current action by the same process as step S114 of the first embodiment.

The processor 32 receives the next sensor data and reward by processes similar to steps S116 and S118 of the first embodiment.

The processor 32 updates the value of parameter Θ by a process similar to the process described in the fourth embodiment.

Sixth Embodiment

In the first to fifth embodiments, the control target 10 is an automobile, and the action option is the change of a driving lane of an automobile (action control in a direction perpendicular to the driving direction), but these can be modified. If the control target 10 is an automobile, action control along a driving direction is also possible. For example, "accelerate", "decelerate", or "make constant speed" may be the action options. In this case, the consistency of the action selected in each action selection is "accelerates by XX km/h", "accelerates/decelerates by X km/h", . . . or "decelerates by X km/h", . . . . Furthermore, it is possible to perform action control related to a combination of an action in a direction perpendicular to the driving direction and an action in a direction along the driving direction. The combined action includes "change to left lane and accelerate by X km/h", "run at a constant speed while maintaining lane", and the like. The control target 10 is not limited to an automobile, and may be a mobile target such as a self-propelled robot, a drone, or a railway.

Seventh Embodiment

Figure 17A:
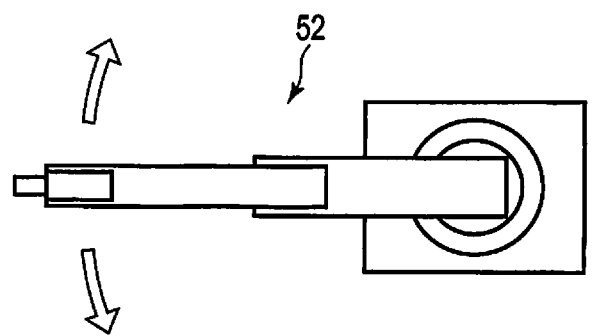
FIGS. 17A and 17B are diagrams illustrating an example of action control in a seventh embodiment.
Figure 17B:
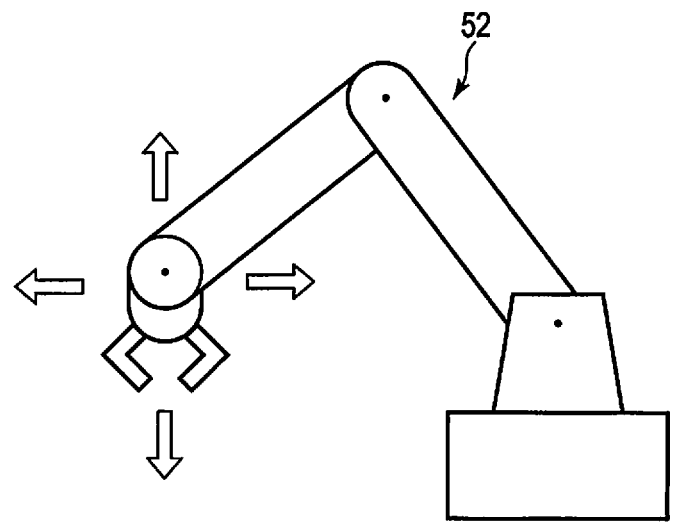

In the above description, the control target 10 is a moving object, but may be a movable object such as a robot arm. FIG. 17A shows a robot arm 52 viewed from above, and FIG. 17B shows the robot arm 52 viewed from the side. Examples of robot arm action control includes "turn the arm to the right", "turn the arm to the left", and "fix the arm" as shown in FIG. 17A and "extend the arm", "close (shrink) the arm", "raise the arm", "lower the arm", "grab the article", "release the article", "fix the arm" and the like as shown in FIG. 17B. Furthermore, these arbitrary plural actions may be combined into one action. Examples of the movable object are not limited to the robot arm, but include other manufacturing apparatuses.

Furthermore, the reinforcement learning of the embodiment is not limited to the action control of the moving object and the movable object, but can be applied to the control of the action related to the operation of the plant and the control of the action of the computer.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

What is claimed is:

1. A learning method, comprising:
first receiving a first signal including a previous auxiliary variable value, previous action information regarding a previous action of a control target, or a set of previous scores;
second receiving current sensor data;
selecting a current action of the control target based on the first signal, the current sensor data, and a value of a parameter for obtaining a score from sensor data;
causing the control target to execute the current action;
third receiving next sensor data and a reward; and
updating a value of the parameter based on the current sensor data, current action information regarding the current action, the next sensor data, and the reward,
wherein the selecting comprises increasing a degree of selecting a previous action as the current action.

2. The learning method of claim 1, wherein the first receiving, the second receiving, the selecting, the causing, the third receiving, and the updating are executed every control period of the control target.

3. The learning method of claim 1, wherein the selecting comprises:
first calculating a set of current scores based on the current sensor data and the value of the parameter before update;
second calculating a current auxiliary variable value based on the previous auxiliary variable value; and
third selecting the current action based on the set of current scores and the current auxiliary variable, and
wherein the second calculating comprises:
setting the previous auxiliary variable value as the current auxiliary variable value.

4. The learning method of claim 1, wherein the selecting comprises:
first calculating a set of current scores based on the current sensor data and the value of the parameter before update;
second calculating a set of mixed scores based on the set of current scores and the previous action information;
third calculating a current auxiliary variable value based on the previous auxiliary variable value; and
fourth selecting a current action based on the set of mixed scores and the current auxiliary variable value, and
wherein the second calculating comprises calculating the set of mixed scores by mixing the set of current scores and a set of scores in which a score for a same action as the previous action is larger than scores for actions other than the previous action.

5. The learning method of claim 1, wherein the selecting comprises:
first calculating a set of current scores based on the current sensor data and the value of the parameter;
second calculating a set of mixed scores from the set of current scores and the set of previous scores;
third calculating a current auxiliary variable value based on the previous auxiliary variable value; and
fourth selecting a current action based on the set of mixed scores and the current auxiliary variable value, and
wherein the second calculating comprises:
calculating the set of mixed scores by mixing the set of previous scores and the set of current scores.

6. The learning method of claim 1, wherein the selecting comprising:
increasing a degree of selecting the previous action as the current action during a period required from start of execution of the current action to completion of execution of the current action by the control target.

7. The learning method of claim 1, wherein the control target comprises an automobile, and wherein the selecting comprises:
increasing a degree of selecting the previous action as the current action during a period required from start of lane change to completion of the lane change by the automobile.

8. The learning method of claim 1, wherein the control target comprises an automobile, and wherein the selecting comprises:
increasing a degree of selecting the previous action as the current action during a period required from start of speed change to completion of the speed change by the automobile.

9. A non-transitory computer-readable storage medium having stored thereon a computer program that is executable by a computer, the computer program comprising instructions capable of causing the computer to execute functions of:
first receiving a first signal including a previous auxiliary variable value, previous action information regarding a previous action of a control target, or a set of previous scores;
second receiving current sensor data;
selecting a current action of the control target based on the first signal, the current sensor data, and a value of a parameter for obtaining a score from sensor data;
causing the control target to execute the current action;
third receiving next sensor data and a reward; and
updating a value of the parameter based on the current sensor data, current action information regarding the current action, the next sensor data, and the reward,
wherein the selecting comprises increasing a degree of selecting a previous action as the current action.

10. The storage medium of claim 9, wherein the first receiving, the second receiving, the selecting, the causing, the third receiving, and the updating are executed every control period of the control target.

11. The storage medium of claim 9, wherein the selecting comprises:
first calculating a set of current scores based on the current sensor data and the value of the parameter before update;
second calculating a current auxiliary variable value based on the previous auxiliary variable value; and
third selecting the current action based on the set of current scores and the current auxiliary variable, and wherein the second calculating comprises:
setting the previous auxiliary variable value as the current auxiliary variable value.

12. The storage medium of claim 9, wherein the selecting comprises:
first calculating a set of current scores based on the current sensor data and the value of the parameter before update;
second calculating a set of mixed scores based on the set of current scores and the previous action information;
third calculating a current auxiliary variable value based on the previous auxiliary variable value; and
fourth selecting a current action based on the set of mixed scores and the current auxiliary variable value, and wherein the second calculating comprises calculating the set of mixed scores by mixing the set of current scores and a set of scores in which a score for a same action as the previous action is larger than scores for actions other than the previous action.

13. The storage medium of claim 9, wherein the selecting comprises:
first calculating a set of current scores based on the current sensor data and the value of the parameter;
second calculating a set of mixed scores from the set of current scores and the set of previous scores;
third calculating a current auxiliary variable value based on the previous auxiliary variable value; and
fourth selecting a current action based on the set of mixed scores and the current auxiliary variable value, and wherein the second calculating comprises:
calculating the set of mixed scores by mixing the set of previous scores and the set of current scores.

14. The storage medium of claim 9, wherein the selecting comprising:
increasing a degree of selecting the previous action as the current action during a period required from start of execution of the current action to completion of execution of the current action by the control target.

15. The storage medium of claim 9, wherein the control target comprises an automobile, and wherein the selecting comprises:
increasing a degree of selecting the previous action as the current action during a period required from start of lane change to completion of the lane change by the automobile.

16. The storage medium of claim 9, wherein the control target comprises an automobile, and wherein the selecting comprises:
increasing a degree of selecting the previous action as the current action during a period required from start of speed change to completion of the speed change by the automobile.

* * * * *